US006486780B1

(12) United States Patent
Garber et al.

(10) Patent No.: US 6,486,780 B1
(45) Date of Patent: Nov. 26, 2002

(54) APPLICATIONS FOR RADIO FREQUENCY IDENTIFICATION SYSTEMS

(75) Inventors: Sharon R. Garber, Crystal; Bernard A. Gonzalez, St. Paul; Mitchell B. Grunes, Minneapolis; Richard H. Jackson, Inver Grove Heights; Gerald L. Karel, Maplewood; John M. Kruse, Minneapolis; Richard W. Lindahl, Oakdale; James E. Nash, Bloomington; Chester Piotrowski, White Bear Lake; John D. Yorkovich, Maplewood, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/619,220

(22) Filed: Jul. 19, 2000

Related U.S. Application Data

(60) Division of application No. 09/368,826, filed on Aug. 5, 1999, which is a continuation-in-part of application No. 09/344,758, filed on Jun. 25, 1999, now abandoned, which is a continuation-in-part of application No. 09/134,686, filed on Aug. 14, 1998, now abandoned.

(51) Int. Cl.[7] ................................................ G08B 13/14
(52) U.S. Cl. .................... 340/572.1; 235/385; 340/5.92
(58) Field of Search ..................... 340/572.1, 5.92, 340/10.1, 693.1, 693.5, 531, 533, 539, 825.49; 235/375, 385

(56) References Cited

U.S. PATENT DOCUMENTS

| 3,747,086 A | 7/1973 | Peterson ..................... 340/280 |
| 3,752,960 A | 8/1973 | Walton ......................... 235/61 |
| 3,790,945 A | 2/1974 | Fearon ........................ 340/280 |
| 3,816,708 A | 6/1974 | Walton ......................... 235/61 |
| 4,063,229 A | 12/1977 | Welsh et al. ................. 340/280 |
| 4,141,078 A | 2/1979 | Bridges, Jr. et al. ......... 364/900 |
| 4,153,931 A | 5/1979 | Green et al. ................. 364/200 |
| 4,183,027 A | 1/1980 | Ehrenspeck .................. 343/726 |
| 4,223,830 A | 9/1980 | Walton ........................ 235/380 |

(List continued on next page.)

FOREIGN PATENT DOCUMENTS

| DE | 43 19 878 | 12/1993 | ............ G06K/7/08 |
| DE | 44 15 801 | 9/1994 | ........... G08B/13/24 |
| DE | 43 41 880 A1 | 6/1995 | ........... G07C/11/00 |
| EP | 0 494 114 | 7/1992 | ............ G07C/9/00 |
| EP | 0 526 038 | 2/1993 | ........... G08B/13/24 |
| EP | 0 585 132 | 3/1994 | ........... G01S/13/78 |
| EP | 0 598 624 | 5/1994 | ........... G01S/13/02 |

(List continued on next page.)

OTHER PUBLICATIONS

Flyer entitled "Combined Anti–Theft and RF Programmable Tag" from ISD (RF/ID) Ltd.

John Bowers; "Road to intelligent tagging is paved with opportunities"; Automatic I.D. News; Oct. 1995; pp. 86–87.

Finkenzeller; "RFID Handbook—Radio–Frequency Identification Fundamentals and Applications"; 1999; pp. 227–273.

(List continued on next page.)

*Primary Examiner*—Thomas Mullen
(74) *Attorney, Agent, or Firm*—Nestor F. Ho

(57) ABSTRACT

The present invention relates to RFID devices, including handheld RFID devices, and applications for such devices. The devices and applications may be used in connection with items that are associated with an RFID tag, and optionally a magnetic security element. The devices and applications are described with particular reference to library materials such as books, periodicals, and magnetic and optical media.

29 Claims, 11 Drawing Sheets

U.S. PATENT DOCUMENTS

| | | | |
|---|---|---|---|
| 4,312,003 A | 1/1982 | Robbins, Jr. | 343/788 |
| 4,319,674 A | 3/1982 | Riggs et al. | 194/4 |
| 4,407,000 A | 9/1983 | Sasaki et al. | 343/726 |
| 4,413,254 A | 11/1983 | Pinneo et al. | 340/572 |
| 4,442,507 A | 4/1984 | Roesner | 365/100 |
| 4,471,345 A | 9/1984 | Barrett, Jr. | 340/572 |
| 4,578,654 A | 3/1986 | Tait | 333/175 |
| 4,580,041 A | 4/1986 | Walton | 235/380 |
| 4,583,083 A | 4/1986 | Bogasky | 340/572 |
| 4,598,276 A | 7/1986 | Tait | 340/572 |
| 4,636,950 A | 1/1987 | Caswell et al. | 364/403 |
| 4,656,463 A | 4/1987 | Anders et al. | 340/572 |
| 4,676,343 A | 6/1987 | Humble et al. | 186/61 |
| 4,688,026 A | 8/1987 | Scribner et al. | 340/572 |
| 4,745,401 A | 5/1988 | Montean | 340/572 |
| 4,746,830 A | 5/1988 | Holland | 310/313 |
| 4,746,908 A | 5/1988 | Montean | 340/551 |
| 4,785,308 A | 11/1988 | Newcomb | 343/795 |
| 4,796,074 A | 1/1989 | Roesner | 357/51 |
| 4,805,232 A | 2/1989 | Ma | 455/291 |
| 4,827,395 A | 5/1989 | Anders et al. | 364/138 |
| 4,831,363 A | 5/1989 | Wolf | 340/572 |
| 4,837,568 A | 6/1989 | Snaper | 340/825 |
| 4,857,893 A | 8/1989 | Carroll | 340/572 |
| 4,862,160 A | 8/1989 | Ekchian et al. | 340/825 |
| 4,881,061 A | 11/1989 | Chambers | 340/568 |
| 4,924,210 A | 5/1990 | Matsui et al. | 340/572 |
| 4,964,053 A | 10/1990 | Humble | 364/466 |
| 4,967,185 A | 10/1990 | Montean | 340/572 |
| 5,019,815 A | 5/1991 | Lemelson et al. | 340/933 |
| 5,036,308 A | 7/1991 | Fockens | 340/572 |
| 5,059,951 A | 10/1991 | Kaltner | 340/572 |
| 5,063,380 A | 11/1991 | Wakura | 340/825 |
| 5,072,222 A | 12/1991 | Fockens | 342/44 |
| 5,083,112 A | 1/1992 | Piotrowski et al. | 340/572 |
| 5,095,362 A | 3/1992 | Roesner | 357/23.4 |
| 5,099,226 A | 3/1992 | Andrews | 340/572 |
| 5,099,227 A | 3/1992 | Geiszler et al. | 340/572 |
| 5,103,222 A | 4/1992 | Hogen Esch et al. | 340/825 |
| 5,119,070 A | 6/1992 | Matsumoto et al. | 340/572 |
| 5,124,699 A | 6/1992 | Tervoert et al. | 340/825 |
| 5,151,684 A | 9/1992 | Johnsen | 340/572 |
| 5,153,842 A | 10/1992 | Dlugos, Sr. et al. | 364/478 |
| 5,204,526 A | 4/1993 | Yamashita | 235/493 |
| 5,214,409 A | 5/1993 | Beigel | 340/572 |
| 5,214,410 A | 5/1993 | Verster | 340/572 |
| 5,218,343 A | 6/1993 | Stobbe et al. | 340/572 |
| 5,218,344 A | 6/1993 | Ricketts | 340/573 |
| 5,260,690 A | 11/1993 | Mann et al. | 340/572 |
| 5,280,159 A | 1/1994 | Schultz et al. | 231/382 |
| 5,288,980 A | 2/1994 | Patel et al. | 235/381 |
| 5,296,722 A | 3/1994 | Potash et al. | 257/50 |
| 5,317,309 A | 5/1994 | Vercellotti et al. | 340/825 |
| 5,331,313 A | 7/1994 | Koning | 340/551 |
| 5,334,822 A | 8/1994 | Sanford | 235/385 |
| 5,339,073 A | 8/1994 | Dodd et al. | 340/825 |
| 5,339,074 A | 8/1994 | Shindley et al. | 340/825 |
| 5,347,263 A | 9/1994 | Carroll et al. | 340/572 |
| 5,347,280 A | 9/1994 | Schuermann | 342/42 |
| 5,353,011 A | 10/1994 | Wheeler et al. | 340/572 |
| 5,378,880 A | 1/1995 | Eberhardt | 235/439 |
| 5,392,028 A | 2/1995 | Pichl | 340/572 |
| 5,401,584 A | 3/1995 | Minasy et al. | 428/611 |
| 5,406,263 A | 4/1995 | Tuttle | 340/572 |
| 5,407,851 A | 4/1995 | Roesner | 437/47 |
| 5,420,757 A | 5/1995 | Eberhardt et al. | 361/813 |
| 5,430,441 A | 7/1995 | Bickley et al. | 340/825 |
| 5,432,864 A | 7/1995 | Lu et al. | 382/118 |
| 5,434,775 A | 7/1995 | Sims et al. | 364/403 |
| 5,444,223 A | 8/1995 | Blama | 235/435 |
| 5,446,447 A | 8/1995 | Carney et al. | 340/572 |
| 5,448,110 A | 9/1995 | Tuttle et al. | 257/723 |
| 5,448,220 A | 9/1995 | Levy | 340/539 |
| 5,448,242 A | 9/1995 | Sharpe et al. | 342/42 |
| 5,450,070 A | 9/1995 | Massar et al. | 340/825 |
| 5,450,492 A | 9/1995 | Hook et al. | 380/28 |
| 5,469,363 A | 11/1995 | Saliga | 364/478 |
| 5,471,203 A | 11/1995 | Sasaki et al. | 340/825 |
| 5,477,215 A | 12/1995 | Mandelbaum | 340/825 |
| 5,490,079 A | 2/1996 | Sharpe et al. | 364/467 |
| 5,497,140 A | 3/1996 | Tuttle | 342/51 |
| 5,499,017 A | 3/1996 | Beigel | 340/572 |
| 5,500,651 A | 3/1996 | Schuermann | 342/42 |
| 5,517,195 A | 5/1996 | Narlow et al. | 342/51 |
| 5,519,381 A | 5/1996 | Marsh et al. | 340/572 |
| 5,521,601 A | 5/1996 | Kandlur et al. | 342/44 |
| 5,528,222 A | 6/1996 | Moskowitz et al. | 340/572 |
| 5,528,251 A | 6/1996 | Frein | 343/749 |
| 5,537,105 A | 7/1996 | Marsh et al. | 340/825 |
| 5,539,394 A | 7/1996 | Cato et al. | 340/825 |
| 5,539,775 A | 7/1996 | Tuttle et al. | 375/200 |
| 5,541,585 A | 7/1996 | Duhame et al. | 340/825 |
| 5,541,604 A | 7/1996 | Meier | 342/42 |
| 5,550,547 A | 8/1996 | Chan et al. | 342/42 |
| 5,554,974 A | 9/1996 | Brady et al. | 340/572 |
| 5,565,846 A | 10/1996 | Geiszler et al. | 340/572 |
| 5,565,858 A | 10/1996 | Guthrie | 340/825 |
| 5,574,372 A | 11/1996 | Moritz et al. | 324/318 |
| 5,589,820 A | 12/1996 | Robinson et al. | 340/572 |
| 5,602,527 A | 2/1997 | Suenaga | 340/551 |
| 5,602,538 A | 2/1997 | Orthmann et al. | 340/825 |
| 5,604,486 A | 2/1997 | Lauro et al. | 340/572 |
| 5,625,341 A | 4/1997 | Giles et al. | 340/572 |
| 5,629,981 A | 5/1997 | Nerlikar | 380/25 |
| 5,635,693 A | 6/1997 | Benson et al. | 235/384 |
| 5,635,906 A | 6/1997 | Joseph | 340/572 |
| 5,640,002 A | 6/1997 | Ruppert et al. | 235/472 |
| 5,646,592 A | 7/1997 | Tuttle | 340/572 |
| 5,656,592 A | 8/1997 | Spaanenburg | 364/490 |
| 5,682,142 A | 10/1997 | Loosmore et al. | 340/572 |
| 5,682,143 A | 10/1997 | Brady et al. | 340/572 |
| 5,689,238 A | 11/1997 | Cannon, Jr. et al. | 340/568 |
| 5,689,239 A | 11/1997 | Turner et al. | 340/572 |
| 5,694,139 A | 12/1997 | Saito et al. | 343/866 |
| 5,705,818 A | 1/1998 | Kelbel et al. | 250/361 |
| 5,708,423 A | 1/1998 | Ghaffari et al. | 340/825 |
| 5,739,765 A | 4/1998 | Stanfield et al. | 340/825 |
| 5,745,036 A | 4/1998 | Clare | 340/572 |
| 5,785,181 A * | 7/1998 | Quartararo, Jr. | 209/3.3 |
| 5,786,764 A | 7/1998 | Engellenner | 340/572 |
| 5,793,305 A | 8/1998 | Turner et al. | 340/825 |
| 5,831,533 A | 11/1998 | Kanno | 340/573 |
| 5,842,118 A | 11/1998 | Wood, Jr. | 455/101 |
| 5,850,187 A | 12/1998 | Carrender et al. | 340/825 |
| 5,859,587 A | 1/1999 | Alicot et al. | 340/572 |
| 5,920,261 A | 7/1999 | Hughes et al. | 340/572 |
| 5,929,801 A | 7/1999 | Aslanidis et al. | 342/44 |
| 5,936,527 A | 8/1999 | Isaacman et al. | 340/572.1 |
| 5,939,984 A | 8/1999 | Brady et al. | 340/572 |
| 5,959,568 A | 9/1999 | Woolley | 342/42 |
| 5,963,134 A | 10/1999 | Bowers et al. | 340/572 |
| 5,995,017 A | 11/1999 | Marsh et al. | 340/825 |
| 6,037,879 A | 3/2000 | Tuttle | 340/825 |
| 6,075,441 A | 6/2000 | Maloney | 340/568 |
| 6,078,251 A | 6/2000 | Landt et al. | 340/10.41 |
| 6,104,311 A | 8/2000 | Lastinger | 340/825 |
| 6,127,928 A | 10/2000 | Issacman et al. | 340/572.1 |
| 6,137,411 A | 10/2000 | Tyren | 340/572 |
| 6,150,921 A | 11/2000 | Werb et al. | 340/10.1 |
| 6,154,137 A | 11/2000 | Goff et al. | 340/572.4 |
| 6,172,608 B1 | 1/2001 | Cole | 340/572 |

FOREIGN PATENT DOCUMENTS

| | | | |
|---|---|---|---|
| EP | 0 615 285 | 9/1994 | ........... H01L/21/60 |
| EP | 0 637 093 | 2/1995 | ............ H01Q/5/02 |
| EP | 0 689 151 | 12/1995 | ............ G06K/7/10 |
| EP | 0 702 323 A2 | 3/1996 | ........... G06K/17/00 |
| EP | 0 710 853 | 5/1996 | ........... G01S/13/75 |
| EP | 0 740 262 | 10/1996 | ............ G06K/7/10 |
| EP | 0 747 990 | 12/1996 | ............ H01Q/1/24 |
| EP | 0 762 535 | 3/1997 | ............ H01Q/7/06 |
| EP | 0 794 507 A2 | 9/1997 | ........... G06K/17/00 |
| EP | 0 805 507 | 11/1997 | ............ H01Q/1/27 |
| EP | 0 810 567 | 12/1997 | ............ G08B/13/24 |
| EP | 0 825 672 | 2/1998 | ............ H01Q/5/00 |
| FR | 2 701 146 | 8/1994 | ............. G09F/3/02 |
| GB | 2 098 768 | 11/1982 | ........... G06K/7/08 |
| GB | 2 186 467 | 8/1987 | ........... G08B/13/24 |
| GB | 2 204 162 | 11/1988 | ........... G06F/15/24 |
| GB | 2 257 278 | 1/1993 | ........... G08B/13/00 |
| GB | 2 306 726 A | 5/1997 | ........... G08C/15/06 |
| JP | 2-301893 | 12/1990 | ........... G07F/17/00 |
| JP | 04047995 | 2/1992 | ........... B42D/15/10 |
| JP | 4-255090 | 9/1992 | ............ G07C/9/00 |
| JP | 5-266267 | 10/1993 | ........... G06K/19/07 |
| JP | 6-84024 | 3/1994 | ........... G06K/17/00 |
| JP | 7-150835 | 6/1995 | ............ E05B/49/00 |
| JP | 07254092 | 10/1995 | ........... G08B/13/24 |
| JP | 8-54462 | 2/1996 | ........... G01S/13/78 |
| JP | 8-55160 | 2/1996 | ........... G06F/17/60 |
| JP | 8-108911 | 4/1996 | ........... B65G/1/137 |
| JP | 8-153172 | 6/1996 | ........... G06K/17/00 |
| JP | 8-180152 | 7/1996 | ........... G06K/17/00 |
| NL | 9400091 | 9/1995 | ........... A01K/11/00 |
| WO | WO 965/12870 | 5/1995 | ........... G08B/13/14 |
| WO | WO 97/15031 | 4/1997 | ............ G07F/7/06 |
| WO | WO 97/29464 | 8/1997 | ........... G08B/13/24 |
| WO | WO 97/36270 | 10/1997 | ........... G08B/13/24 |
| WO | WO 97/50057 | 12/1997 | ........... G06M/1/12 |
| WO | WO 98/13800 | 4/1998 | ........... G08B/13/14 |
| WO | WO 98/13804 | 4/1998 | ......... G08B/13/181 |
| WO | WO 98/13805 | 4/1998 | ........... G08B/23/00 |
| WO | WO 98/16070 | 4/1998 | ............ H04Q/1/00 |
| WO | WO 98/27670 | 5/1998 | ............ H04B/7/08 |
| WO | WO 99/05659 | 2/1999 | ........... G08B/13/14 |
| WO | WO 99/05660 | 2/1999 | ........... G08B/13/14 |
| WO | WO 99/64974 | 12/1999 | ........... G06F/19/00 |
| WO | WO 99/65006 | 12/1999 | ........... G08B/17/00 |

OTHER PUBLICATIONS

Information from Internet entitled "Performa® Portable Reader" from Checkpoint Meto, printed Jun. 13, 2001 (2 pp.), Sep. 2000.

Copy of diskette and index entitled Data Transfer Software IBM PC –Version 2.20b from id Systems Ltd. (3 diskettes), undated.

Document entitled Flexiscan Product Range –User Guide: Version 1.10 from id Systems Ltd. (22 pp.), 1999.

Document entitled "Data Transfer Software –User Guide: Version 2.11" from id Systems Ltd. (19 pp.), 1998.

Document entitled "OEM read/write board –Philips Semi-conductors I–CODE –Texas Instruments Tag–it –User Guide: Version 1.10" from id Systems Ltd.(14 pp.), 1998.

Document entitled "RS232 Communication Protocol –User Guide: Version 3.10" from id Systems Ltd. (34 pp.), 1998.

Document entitled "RFID Tag API Specification 16 and 32 Bit Versions –User Guide: Version 3.00" from id Systems Ltd. (38 pp.), 1998.

Abstract for R.J. Marker: The Role and Function of the Shelflist in an Automated Library Environment (Technical Services Quarterly, vol. 14, No. 1, 1996, pp. 33–48).

Abstract for R. Langen: RF/ID Streamlines Circuit Board Assembly (ID Systems European Edition, vol. 1, No. 3, Fall 1993, pp. 19–20).

Herdeen et al.; "Get a Lock on Inventory" Security Management, Arlington, Oct. 1996, pp. 1–6.

"Automated Library Management System" IBM Technical Disclosure Bulletin, Mar. 1992, pp. 311–312.

"Auto ID...putting the control in inventory control"; Industrial Engineering, Norcross; Aug. 1994; Hornack, J.P. (2 pp.).

"Intelligent Tagging"; Retail Business; New York; Dec. 1994; (1 p.).

"In Oakland County: New library computer eases work for staff, lets kids help themselves to titles"; Detroit News; Detroit, Mich.; Oct. 25, 1996; Douglas Ilka (2 pp.).

"Chandler Library 3rd in Valley to Use Checkout by Machine"; Arizona Republic; May 13, 1996; Roberto Sanchez (2 pp.).

"Librarians become 'Cyberian'"; Roanoke Times & World News; Apr. 17, 1996; Kathy Loan (2 pp.).

"Library trying self check–out Staff isn't needed to help patron"; Milwaukee Journal Sentinel; Oct. 5, 1995; Eugene Baer (2 pp.).

"Tammany Libraries Turn Page On Old–Fashioned Checkout"; Times –Picayune; Aug. 25, 1995; Phil White (2 pp.).

Page Description entitled "Self–issue and self–return system selection and performance at the University of Sunderland"; Vine; No. 105, pp. 14–19; 1996.

Page Description entitled "The self–service library" Library Technology News; No. 20; pp. 4–8; Nov. 1995.

Page Description entitled "Asset tagging nears reality"; Security; vol. 31, No. 8, pp. 41–42; Aug. 1994.

\* cited by examiner

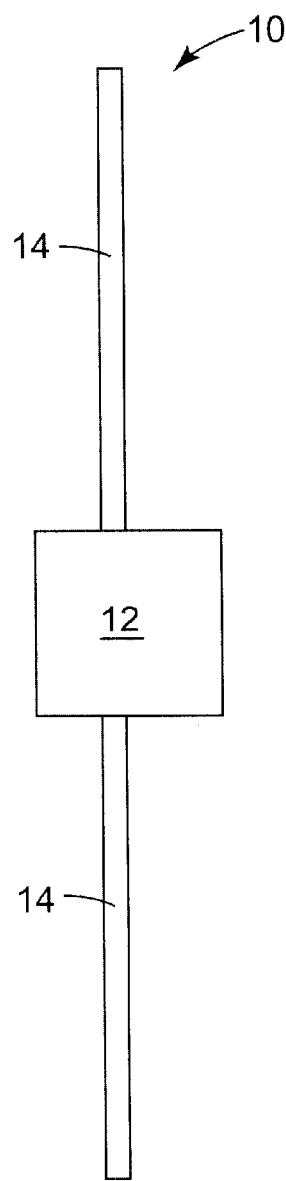
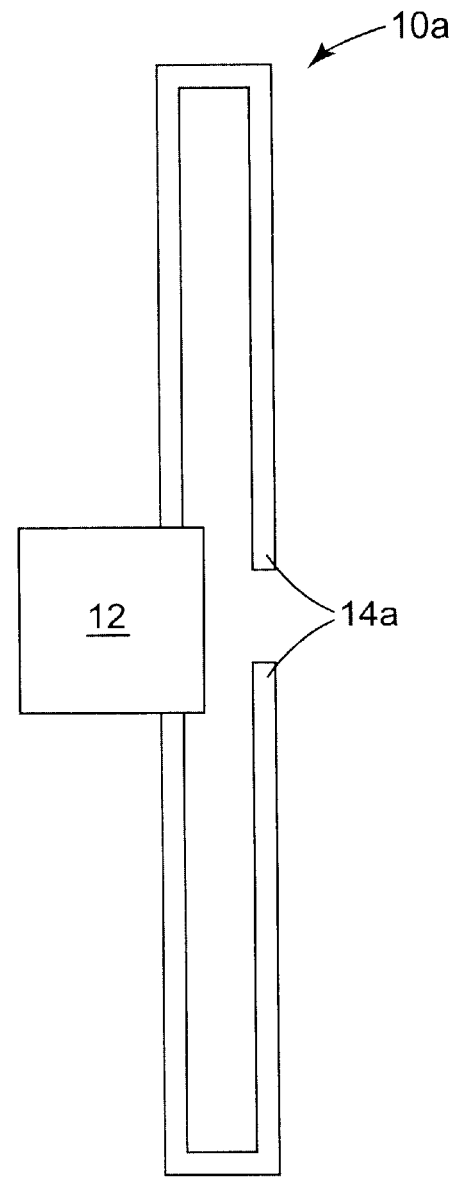
*Fig. 1A*  *Fig. 1B*

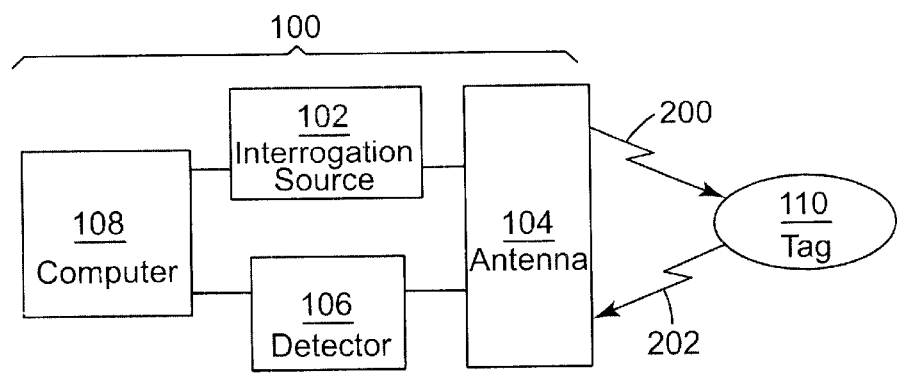
Fig. 4
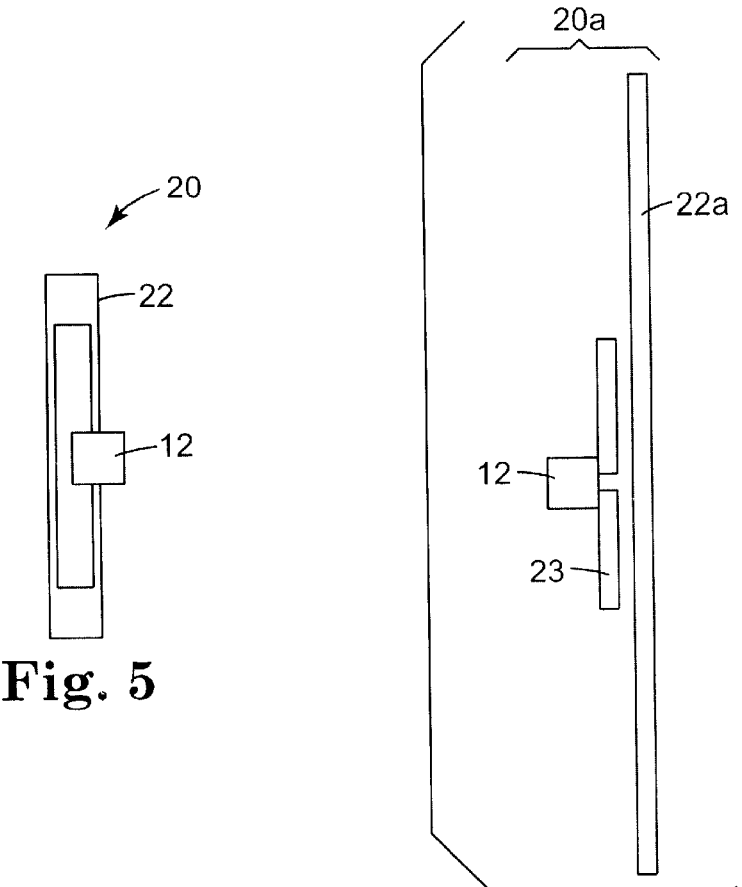
Fig. 5
Fig. 6

APPLICATIONS FOR RADIO FREQUENCY IDENTIFICATION SYSTEMS

INCORPORATION BY REFERENCE

This patent application claims priority from U.S. application Ser. No. 09/134,686, filed Aug. 14, 1998 with the same title (now abandoned), and U.S. application Ser. No. 09/344,758, filed Jun. 25, 1999 with the same title (now abandoned), both of which were assigned to the assignee of the present invention, and the contents of both of which are incorporated by reference herein.

RELATED APPLICATIONS

This patent application is a division of application Ser. No. 09/368,826, filed Aug. 5, 1999, which is a continuation-in-part of U.S. application Ser. No. 09/344,758, filed Jun. 25, 1999, which is a continuation-in-part of U.S. application Ser. No. 09/134,686, filed Aug. 14, 1998.

TECHNICAL FIELD

The invention relates to applications for radio frequency identification (RFID) systems, and particularly to the use of such systems in libraries.

BACKGROUND OF THE INVENTION

Electronic article surveillance ("EAS") systems detect the presence of small electronic devices placed on or in an article or carried by a person of interest, and are often used in retail or library environments to deter theft or other unauthorized removal of articles. These devices, which are commonly known as tags or markers, have in the past contained only information regarding the presence of an item. This information could be obtained by electronically interrogating the tag, either intermittently or continuously. At least four distinct types of EAS systems have evolved over the years, based on how this interrogation was carried out: magnetic, magnetomechanical, radio frequency (RF), and microwave. Of these four, magnetic systems have provided the highest level of security in most applications. Magnetic tags are easily hidden in or on an object, difficult to detect (because they are less susceptible to shielding, bending, and pressure), and easy to deactivate and reactivate, thereby providing a high degree of security and some information regarding the status of the tagged article.

Many users of EAS systems desire to know more than just whether a tagged object is present. They also want to know which tagged object is present, for example. Detailed information regarding the characteristics of objects, such as their date of manufacture, inventory status, and owner have generally been communicated to automated handling and control systems through an optical bar code. While inexpensive and effective, the optical bar code system has certain limitations. Bar codes must be visible, which limits the locations in which they may be placed, and bar codes can easily be obscured, either accidentally or intentionally. The range at which a detector can sense the bar code is also comparatively small. The bar code may also have to be appropriately positioned for detection. Also, because bar codes are often exposed to permit detection, the barcode is susceptible to damage that can result in detection failures. Lastly, multiple items must be processed one at a time. These constraints of bar code systems make them undesirable or inefficient for some applications, such as marking library media.

More recently, electronic identification (also known as radio frequency identification or RFID) techniques have been developed to address the limitations of optical barcodes. RFID systems have succeeded in providing object identification and tracking, but are deficient in providing object security because most RFID systems operate in frequency ranges (~1 MHz and above) in which the tag is easily defeated. The security deficiency associated with radio frequency tags arises because they can be "shielded" by, for example, covering the tag with a hand or aluminum foil, or even placing the tag in a book. Even battery-powered radio frequency tags may be blocked, although their range is superior and blocking would be more difficult. Thus, objects tagged with an RFID tag may escape detection, either inadvertently or intentionally. This greatly reduces their effectiveness as security devices. RFID markers are also related to "smart cards." Both contact and contactless smart cards have appeared in commercial applications. Smart cards tend to be associated with a specific person rather than with a tagged object. Issues related to the security and tracking of the smart card (or of the person carrying it) are similar to those discussed above for RFID markers.

The security issues associated with RFID markers are similar to those familiar to anyone skilled in the art of radio frequency- and microwave-based EAS tags. Substantial effort has been expended in attempts to remedy the deficiencies of radio frequency- and microwave-based EAS tags. However, none has substantially improved their performance as security tags. U.S. Pat. No. 5,517,195 (Narlow et al.), entitled "Dual Frequency EAS Tag with Deactivation Coil," describes a dual frequency microwave EAS tag that includes an antenna circuit having a diode, and a deactivation circuit. The deactivation circuit responds to a low energy alternating magnetic field by inducing a voltage in the diode of the antenna circuit so as to disable the diode and the antenna, thereby deactivating the tag. Although useful for some applications, the capacitor-based tag disclosed in Narlow et al. may leak electrical charge over time, which could cause the tag to become activated unintentionally.

Radio, frequency EAS tags of the type disclosed in U.S. Pat. No. 4,745,401 (Montean et al.) include a magnetic element. The magnetic element alters the tuning of the tag when it has been suitably magnetized by an accessory device, and thereby blocks the radio frequency response of the tag. Although these tags have a certain utility, they still do not address the issues of enhanced security and identification.

Radio frequency identification technology has been developed by a number of companies, including Motorola/Indala (see U.S. Pat. Nos. 5,378,880 and 5,565,846), Texas Instruments (see U.S. Pat. Nos. 5,347,280 and 5,541,604), Mikron/Philips Semiconductors, Single Chip Systems (see U.S. Pat. Nos. 4,442,507; 4,796,074; 5,095,362; 5,296,722; and 5,407,851), CSIR (see European document numbers 0 494 114 A2; 0 585 132 A1; 0 598 624 A1; and 0 615 285 A2), IBM (see U.S. Pat. Nos. 5,528,222; 5,550,547; 5,521,601; and 5,682,143), and Sensormatic Electronics (see U.S. Pat. No. 5,625,341). These tags all attempt to provide remote identification without the need for a battery. They operate at frequencies ranging from 125 KHz to 2.45 GHz. The lower frequency tags (~125 KHz) are moderately resistant to shielding, but have only limited radio frequency functionality due to bandwidth constraints. In particular, systems based on these markers generally operate reliably only when a single tag is in the interrogation zone at a time. They also tend to be relatively bulky and expensive to manufacture. At higher frequencies, (typically 13.56 MHz, 915 MHz, and 2.45 GHz), the added bandwidth available has permitted the development of systems which can reliably process multiple tags in the interrogation zone in a short period of time. This is highly desirable for many product applications. In addition, some of the tag designs hold the promise of being relatively inexpensive to manufacture and therefore more attractive to a customer. However, these higher frequency devices share to varying degrees the susceptibility to shielding discussed earlier. Thus, they cannot provide the high level of security demanded in certain applications, such as a library.

From the foregoing discussion, it should be clear that there are a number of applications for RFID tags in various environments in which the identity of the tagged item is important. For example, PCT Publication WO 99/05660, published Feb. 4, 1999 and assigned to Checkpoint Systems, Inc., describes an inventory system using articles with RFID tags. The preferred embodiment described therein contemplates the use of RFID tags in library materials, which may then be checked out automatically by interrogating the RFID tag to determine the identity of the material. However, a number of important or desirable library or other inventory functions remain that are not described or suggested in the '660 publication.

SUMMARY OF THE INVENTION

The present invention relates to RFID devices, including handheld RFID devices, and applications for such devices. The devices and applications may be used in connection with items that are associated with an RFID tag, and optionally a magnetic security element. The devices and applications are described with particular reference to library materials such as books, periodicals, and magnetic and optical media. Other applications for the present invention are also envisioned.

BRIEF DESCRIPTION OF THE DRAWINGS

The present invention is described in greater detail with reference to the attached Figures, in which like numbers represent like structure throughout the several views, and in which FIGS. 1A and 1B are schematic illustrations of radio frequency identification tags;

FIG. 4 is a block diagram of an RFID interrogation system interacting with an RFID tag;

FIGS. 5, 6, 7, and 8 are illustrations of combination tags according to the present invention.

DETAILED DESCRIPTION OF THE INVENTION

Figure 2:
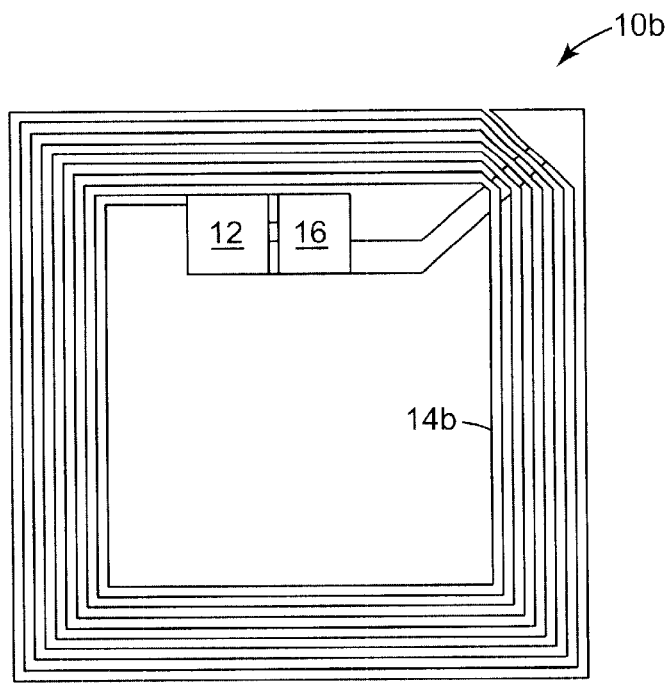
FIG. 2 is a schematic of a second embodiment of a radio frequency identification tag.

The embodiments of the present invention described herein make use of RFID tags, and preferably of combination RFID/magnetic security tags. Tags of this type were disclosed in U.S. application Ser. No. 09/093,120, filed Jun. 8, 1998 and entitled "Identification Tag With Enhanced Security," which was assigned to the assignee of the present invention and was incorporated by reference into the U.S. application from which the present application claims priority. A detailed description of the magnetic, RFID, and combination tags used in conjunction with the embodiments of the present invention is described in Section I, below, and the embodiments of the present invention are then set forth in detail in Section II, below.

I. Tags and Elements For Use With Embodiments of the Present Invention

A tag used with the embodiments of the invention described in Section II, below, may incorporate both object identification and effective security in a single device. They preferably include an element that is responsive to a magnetic interrogation signal, and an element that is responsive to a radio frequency interrogation signal. In one embodiment, the magnetically-responsive element also provides the antenna for the radio frequency-responsive element. The term "responsive" means, in the context of the present invention, that the element provides intelligible information when subjected to an appropriate interrogation field. The individual elements are described first below, followed by a description of a combination tag. As will become apparent, the embodiments of the present invention described in Section II, below, may include either an RFID element alone, or a combination of an RFID element and a magnetic security element.

A. The Magnetically-Responsive Element

The magnetically-responsive element is preferably made of a low coercive force, high permeability ferromagnetic material, such as the material used in the strips sold by the Minnesota Mining and Manufacturing Company of St. Paul, Minn. (3M) under the designation "TATTLE-TAPE™" brand strips. These strips, or marker assemblies, are described in several patents assigned to 3M, including U.S. Pat. Nos. 5,331,313 (Koning) and 3,747,086 (Peterson), the contents of which are incorporated by reference herein. Exemplary low coercive force, high permeability ferromagnetic materials include permalloy (a nickel/iron alloy), and high performance amorphous metals such as those available front the AlliedSignal Company of Morristown, N.J. under the designations Metglas 2705M and Metglas 2714A.

The magnetically-responsive element may be either single status or dual status, depending on the nature of the article with which the element is associated. For example, certain reference books in libraries are not to be removed from the library, and thus a single-status (non-deactivatable) marker would always indicate whether such a book passed within an interrogation zone. Other articles, such as common library materials or commercial goods, may require a dual-status marker assembly, so that when the article has been properly processed the marker may be appropriately deactivated to prevent detection by the interrogation source. Dual status functionality is generally provided through the addition of sections of higher coercivity magnetic material in proximity to the low coercivity magnetic material, as described below and in the Peterson patent incorporated by reference above.

Certain magnetically-responsive elements have the ability to switch magnetic orientation rapidly when passed through a low frequency alternating magnetic field (50 Hz to 100 KHz, for example), and to produce a predetermined characteristic response that may be detected by the receiving coils of a detector. The switching function of the marker assembly is controlled by the magnetization state of the high coercive force elements, or "keeper elements." When these keeper elements are magnetized, the ability of the marker to magnetically switch back and forth within the alternating magnetic field of the interrogation zone is altered, and the marker typically is not detected. When the keeper elements are demagnetized, the marker can again perform the switching function, enabling the interrogation source to detect the presence of the marker. The keeper elements may be provided in different ways, as is known in the art.

The marker assembly may also include adhesive on one or both sides thereof, to enable the marker to be bonded to a book or other article. The adhesive layer(s) may be covered by a removable liner, to prevent adhesion of the marker to an unintended surface prior to application to the intended surface. These and other features of the marker assembly are described in the U.S. Pat. Nos. 3,790,945 (Fearon), 5,083,112 (Piotrowski), and 5,331,313 (Koning), all incorporated by reference above.

Because low frequency magnetic elements of this type are difficult to shield from detection, they may be effectively used on a wide variety of items when security is important. In addition, they may be deactivated and reactivated more conveniently, completely, and repeatedly than markers employing other EAS technologies, making them more suitable for use in certain applications (such as libraries) where this characteristic is highly desirable.

B. The Radio Frequency-Responsive Element

RFID tags can be either active or passive. An active tag incorporates an additional energy source, such as a battery, into the tag construction. This energy source permits active RFID tags to create and transmit strong response signals even in regions where the interrogating radio frequency field is weak, and thus an active RFID tag can be detected at greater range. However, the relatively short lifetime of the battery limits the useful life of the tag. In addition, the battery adds to the size and cost of the tag. A passive tag derives the energy needed to power the tag from the interrogating radio frequency field, and uses that energy to transmit response codes by modulating the impedance the antenna presents to the interrogating field, thereby modulating the signal reflected back to the reader antenna. Thus, their range is more limited. Because passive tags are preferred for many applications, the remainder of the discussion will be confined to this class of tag. Those skilled in the art, however, will recognize that these two types of tags share many features and that both can be used with this invention.

As shown in FIG. 1, a passive radio frequency-responsive element 10 typically includes two components: an integrated circuit 12 and an antenna 14. The integrated circuit provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID markers include those available from Texas Instruments (in their TIRIS or TAG-IT line of products), Philips (in their I-CODE, MIFARE and HITAG line of products), Motorola/Indala, and Single Chip Systems, among others.

The antenna geometry and properties depend on the desired operating frequency of the RFID) portion of the tag. For example, 2.45 GHz (or similar) RFID tags would typically include a dipole antenna, such as the linear dipole antennas 14 shown in FIG. 1A, or the folded dipole antennas 14a shown attached to the radio frequency responsive element 10a in FIG. 1B. A 13.56 MHz (or similar) RFID tag would use a spiral or coil antenna 14b, as shown attached to the radio frequency responsive element 10b in FIG. 2. In either ease, the antenna 14 intercepts the radio frequency energy radiated by an interrogation source. This signal energy carries both power and commands to the tag. The antenna enables the RF-responsive element to absorb energy sufficient to power the IC chip and thereby provide the response to be detected. Thus, the characteristics of the antenna must be matched to the system in which it is incorporated. In the case of tags operating in the high MHz to GHz range, the most important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable and are, in fact, preferred for purposes of this invention. It is also important that the input impedance of the selected IC chip match the impedance of the antenna for maximum energy transfer. Additional information about antennas is known to those of ordinary skill in the art from, for example, reference texts such as J. D. Kraus, Antennas (2d ed. 1988, McGraw-Hill, Inc. New York).

A capacitor 16 is often included to increase the performance of the marker, as shown in FIG. 2. The capacitor 16, when present, tunes the operating frequency of the tag to a particular value. This is desirable for obtaining maximum operating range and insuring compliance with regulatory requirements. The capacitor may either be a discrete component, or integrated into the antenna as described below. In some tag designs, particularly tags designed to operate at very high frequencies, such as 2.45 GHz, a tuning capacitor is not required. The capacitor is selected so that, when coupled to the inductance provided by the antenna, the resonant frequency of the composite structure, given by:

$$f_r = \left(\frac{1}{2\pi}\right)\sqrt{\frac{1}{LC}}$$

where
C=capacitance (in Farads)
L=inductance (in Henries)
closely matches the desired operating frequency of the RFID system. The capacitor may also be a distributed capacitor as described in U.S. Pat. Nos. 4,598,276 (Tait et al.) and 4,578,654 (Tait et al.), which are assigned to 3M. Distributed capacitance is desirable to reduce tag size, particularly thickness, and to minimize manual assembly.

In operation, as shown in FIG. 4, the radio frequency-responsive tag 110 is interrogated by an EAS security system 100, which is typically located near the point at which the tags are to be monitored. An interrogation zone may be established by placing spaced detection panels across the exits from the room in which the tagged articles are located, near a conveyor carrying items to be monitored, or the like. Hand held detection devices may also be used. An interrogation source 102 (typically including a drive oscillator and an amplifier) is coupled to an antenna 104 (sometimes described as a field coil) for transmitting an alternating radio frequency field, or interrogation signal, in the interrogation zone. The system 100 also includes an antenna for receiving a signal (shown as antenna 104, and sometimes described as a receiving coil) and detector 106 for processing signals produced by tags in the interrogation zone.

The interrogation source 102 transmits an interrogation signal 200, which may be selected within certain known frequency bands that are preferred because they do not interfere with other applications, and because they comply with applicable government regulations. When the radio frequency-responsive element receives an interrogation signal it transmits its own response code signal 202 that is received by the antenna 104 and transmitted to detector 106. The detector decodes the response, identifies the tag (typically based on information stored in a computer or other memory device 108), and takes action based on the code signal detected. Various modifications of the illustrated system are known to those of skill in the art including, for example, using separate antennas for the interrogation source 102 and the detector 106 in place of the single antenna 104 that is illustrated.

Modern RFID tags also provide significant amounts of user accessible memory, sometimes in the form of read-only memory or write-once memory, but more preferably offering the user the ability to repeatedly update the memory by rewriting its contents from a distance. The amount of memory provided can vary, and influences the size and cost of the integrated circuit portion of an RFID tag. Typically, between 128 bits and 512 bits of total memory can be provided economically. For example an RFID tag available from Texas Instruments of Dallas, Tex., under the designation "Tag-it" provides 256 bits of user programmable memory in addition to 128 bits of memory reserved for items such as the unique tag serial number, version and manufacturing information, and the like. Similarly, an RFID tag available from Philips Semiconductors of Eindhoven, Netherlands, under the designation "I-Code" provides 384 bits of user memory along with an additional 128 bits reserved for the aforementioned types of information.

This user accessible memory may be exploited to enhance the performance of an item identification system deployed, for example, in a library environment. Presently, libraries identify items by scanning an optical barcode. The unique identifier contained in this barcode is used to access a circulation database including software provided by library automation vendors (LAV software), where more extensive information about the item is permanently maintained. While this system has been highly developed and works very well in many applications, it may have two disadvantages. First, a connection to the circulation database must be established to access the information. This limits the availability of the information when an item is at a location remote from a connection to this database. Second, the retrieval of information from the circulation database can sometimes require an unacceptably long time, particularly during periods of heavy use. By storing certain critical items of information on the RFID tag, both of these limitations can be overcome.

One example of information which could improve the performance of a library identification system if present on the RFID tag itself would be a library identification number. Then, without accessing a database, an item's "home" library could be quickly and conveniently determined by simply scanning the RFID label. Another example of information preferably present on an RFID tag itself would be a code designating whether the item was a book, a video tape, an audio tape, a CD, or some other item. This code could, for example, comprise the media type code specified in the 3M Standard Interchange Protocol, which is available from the assignee of the present invention. By immediately knowing the media type, a library's material management systems could insure that an item was being appropriately processed without incurring the delay and inconvenience of consulting a remote circulation database. Other examples of information suitable for incorporation into the RFID label will be apparent to those skilled in the art.

Another area in which RFID systems offer an advantage over barcode-based systems is in the identification of multiple items. By using sophisticated software algorithms, RFID readers and markers cooperate to insure that all items in the reader's interrogation zone are successfully identified without intervention by the operator. This capability enables the development of numerous useful applications in the areas of inventory control, item tracking, and sorting that would be difficult or impossible to implement with barcode-based identification systems.

C. The Combination Tag

As shown in FIGS. 3 and 5 through 8, the combination tag 20 combines a magnetically-responsive element with an RF-responsive element to provide the advantages of both. Thus, the two elements can be applied to an item of interest at the same time, thereby reducing cost. The combination tag may be provided with a pressure sensitive adhesive covered by a removable liner, which enables the combination tag to be adhered to a surface of the article when the liner has been removed. In another embodiment, the tag uses the magnetically-responsive element as an antenna for the radio frequency-responsive element. The magnetically-responsive element, when used as an antenna, is electrically coupled to the radio frequency-responsive element, and may or may not also be physically coupled to the radio frequency-responsive element.

The combination tag made according to the present invention may be interrogated two ways. First, the RFID interrogation source would use radio frequency signals to request and receive codes from the integrated circuit. This information would indicate, for example, the identification of the article with which the tag is associated, and whether the article had been properly processed. Second, a magnetic interrogation field would interrogate the tag to determine whether the magnetic portion of the marker assembly was active. If the marker assembly was active, the interrogation source would produce a response, such as a notification that the marked article had not been properly processed. Because the magnetic interrogation is more resistant to shielding than the radio frequency interrogation, the magnetic portion of the combination tag would provide enhanced security. Thus, the features of both magnetic and RFID tags are combined into a single combination tag.

In a preferred embodiment, the combination tag includes a magnetically-responsive element that also functions as the antenna in the circuitry of the radio frequency-responsive element. To serve both functions, the antenna material must exhibit low magnetic coercivity and very high magnetic permeability (to serve as an efficient security element), and moderate to high electrical conductivity (to function as an efficient antenna). In addition, the geometry of the antenna must be compatible with both functions. In this embodiment, the antenna could, for example, be fabricated from permalloy, an alloy of nickel and iron.

In one embodiment, a 3M "Tattle-Tape™" brand security strip, or other equivalent magnetic element, may be used as a linear dipole antenna to operate at 2.45 GHz or a similar high frequency. The length, width and thickness of this strip are selected to match the particular operating frequency and other characteristics of the RFID chip used. Typically, the strip would be made from pernialloy (available from a number of sources including Carpenter Specialty Alloys, Reading, Pa. under the trade name "HyMu80") or an amorphous alloy such as that available from the AlliedSignal Company of Morristown, N.J., under the designation 2705M, and its length would be between 6.35 and 16.5 cm (2.5 and 6.5 inches). The terminals of the integrated circuit would be physically connected to the ends of the security strip. Electrical measurements of impedance and power gain have established that such a magnetic strip provides the same fundamental electrical characteristics as the copper or aluminum dipole antennas normally used with such a chip, and thus it would be expected to perform both functions satisfactorily.

Figure 7:
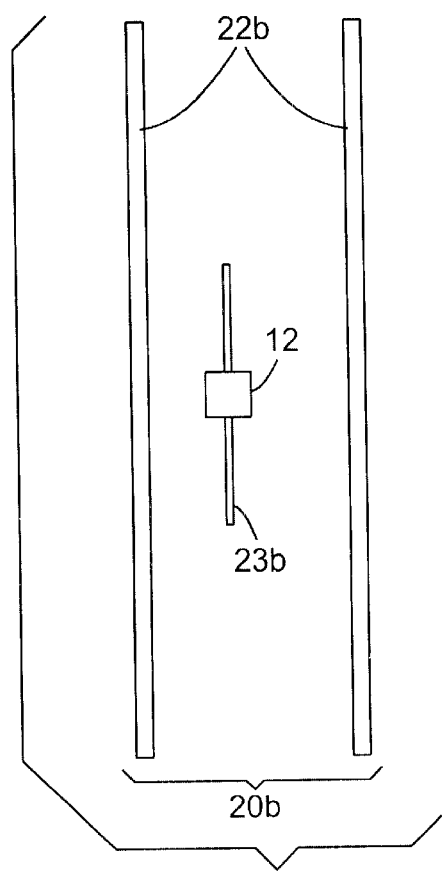
Figure 8:
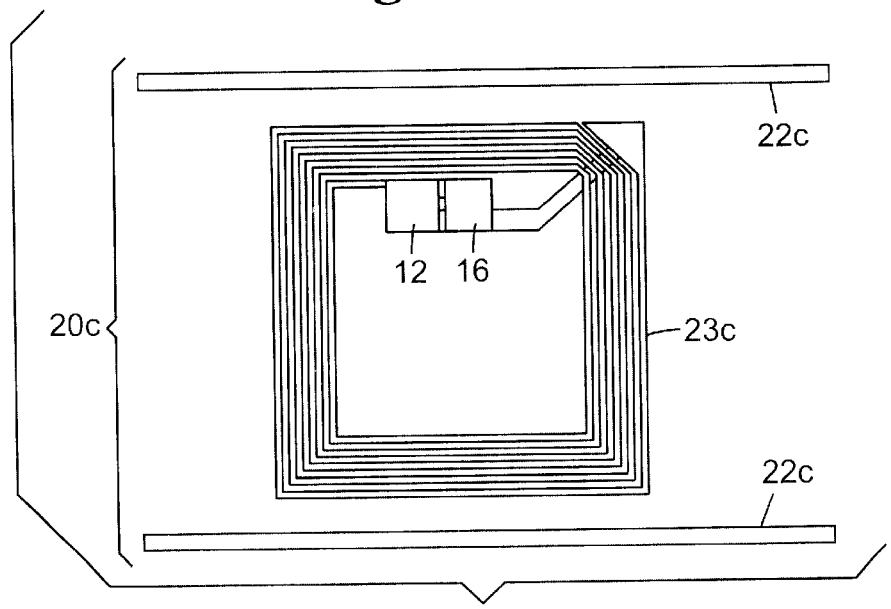

When the magnetically-responsive element is used as at least part of the antenna for the radio frequency-responsive element, the two are electrically coupled to each other. Electrical coupling may occur because of a physical connection between multiple elements (as shown in FIG. 5), or, in the absence of a physical connection, by non-contact electromagnetic coupling (as shown in FIGS. 6, 7, and 8). Non-contact coupling can include parasitic coupling, capacitive coupling, or inductive coupling, and use such antenna components as parasitic antenna elements, reflector and director antennas, Yagi-Uda antennas, or other suitable antenna configurations.

Figure 3:
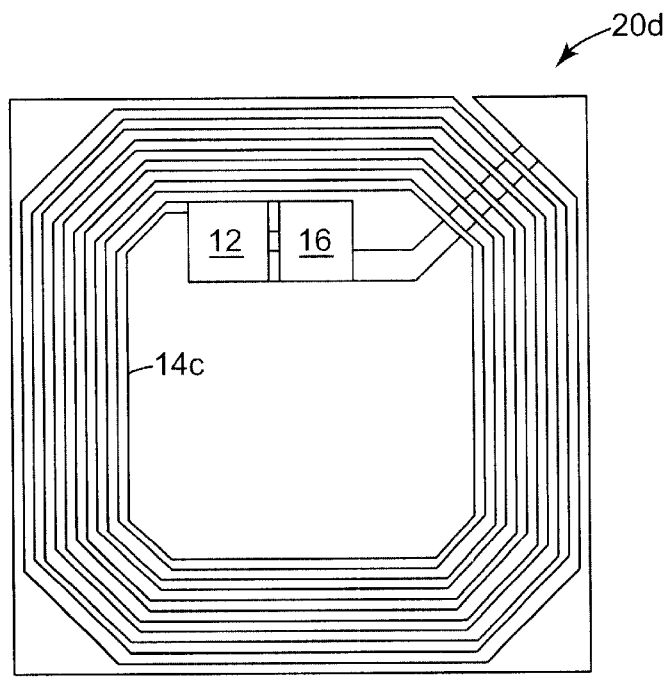
FIG. 3 is a schematic top view of a combination tag.

The combination tag shown in FIG. 3 includes coil turns made from magnetic material. The tag could be, for example, a 13.56 MHz tag having an antenna structure such as 14c in which flux collectors are provided at the corners to improve the magnetic function of the tag. Other types of flux collectors may be provided.

The combination tag 20 shown in FIG. 5 includes a physical connection between the antenna 22, which is made of magnetically-responsive material, and the integrated circuit 12. One or more keeper elements or the type described above also may be applied to the magnetically-responsive material, so that it may be selectively activated and deactivated to provide a dual status tag. The antenna 22a shown in FIG. 6, however, is not physically connected to the integrated circuit 12 or the dipole antenna 23, but is nonetheless electrically coupled to the dipole antenna by parasitic dipole coupling to provide a combination tag 20a. The dipole antenna 23 may comprise either magnetically-responsive material or non-magnetically-responsive material.

FIGS. 7 and 8 illustrate embodiments in which more than one antenna 22 is provided to electrically couple with antennas 23b and 23c, respectively. In the combination tag 20b shown in FIG. 7, integrated circuit 12 includes dipole antenna 23b, which is parasitically coupled to antennas 22b. Antennas 22b are made of magnetically-responsive material, and antenna(s) 23b may be made of magnetically-responsive material. In the combination tag 20c shown in FIG. 8, a radio frequency-responsive element of the type shown in FIG. 2 is parasitically electrically coupled to antennas 22c. Antennas 22c are made of magnetically-responsive material, and antenna(s) 23c may be made of magnetically-responsive material. Other variations of these embodiments are easily designed.

The overall thickness of the combination tag should be as small as possible, to enable the tag to be inconspicuously placed on or in an article. For example, the tag may be applied with adhesive between the pages of a book, and it is desirable to make the tag thin enough to prevent easy detection by observing the end of the book. Conventional ICs may be approximately 0.5 mm (0.02 in) thick, and the overall thickness of the tag is preferably less than 0.635 mm (0.025 in).

The combination tags of this invention may be provided in roll form, to enable the automated sequential application of individual tags to articles. This general system is described in, for example, PCT Publication No. WO 97/36270 (DeVale et al.). Individual combination tags, one or more surfaces of which may be covered by an adhesive (such as a pressure sensitive adhesive), may be removed from the roll and applied between two pages of a book, near its binding. A page spreader may be provided to facilitate insertion of the combination tag, and other options such as sensors to detect the position of various components in the system may also be provided.

The combination tag is believed to have particular, although not exclusive, use in the processing of library materials. Library materials having an RFID tag of this type could be checked in and out more easily, perhaps without human assistance. That is, the materials would automatically be checked out to a particular patron (who may herself have an RFID tag associated with her library card) when the patron passes through a suitable detection zone, and checked back in when the patron re-enters the library with the materials. The tag of the invention may also assist in inventory management and analysis, by enabling library administrators to keep track of materials instantaneously and continuously. These and other features of the invention can, of course, be brought to bear on other applications, such as materials handling in stores, warehouses, and the like.

In another embodiment, the combination tag could provide dual-status marker information both through a magnetic response (indicating whether the magnetic features of the tag had been activated or deactivated) and through a radio frequency response (indicating, through the use of appropriate software, whether the database or the memory on the RFID chip itself showed that the item had been appropriately processed).

The following Examples provide still further information as to the tags used in the embodiments of the invention described in Section II, below.

EXAMPLE ONE

A combination tag was made in accordance with the present invention. A permalloy strip produced from an alloy available from the Carpenter Technology Corporation of Reading, Pa. under the designation "HyMu80" was attached to a test fixture manufactured by Single Chip Systems (SCS) of San Diego, Calif. The strip measured approximately 1.6 mm (0.625 in) wide by 0.0254 mm (0.001 in) thick by 10.16 cm (4 in) long. The test fixture consisted of a standard SCS 2.45 GHz antenna connected to an LED diode. The device was designed so that upon exposure to a 2.45 GHz field strong enough to power a typical SCS RFID tag the LED would glow, providing an immediate visible confirmation of the proper operation of the power-receiving portion of the device. Upon replacing the standard SCS antenna with the prototype permalloy antenna, the LED illuminated at approximately the same field strength, confirming the successful operation of the prototype.

EXAMPLE TWO

FIG. 3 illustrates another embodiment of an antenna that is believed useful with a 13.56 MHz RFID design. At this frequency, a coil-type antenna geometry is preferred. The spiral turns comprising the coil are formed from a magnetic alloy such as permalloy, either by etching (physical or chemical), die cutting, or deposition through a mask. The straight "arm" portions of the coil serve also as the magnetically responsive elements in this design. However, the reduced length of these metallic elements in this geometry limits the effectiveness of the magnetic security portion of the device. In the embodiment shown in FIG. 3, flux collection elements provided at the corners have been added to the antenna coil to overcome this limitation. The construction shown in FIG. 3 would, preferably, include a capacitor as previously described to tune the operating frequency of the antenna to the prescribed interrogation frequency.

The characteristics of the antenna described in this example were compared with the characteristics of known antennas for radio frequency integrated circuits, and because those characteristics were similar, it is believed that the antenna of this example would function adequately in such an application.

The embodiments of the present invention described below may use either a tag having only an RFID element, or a combination tag, both of which are described above.

II. Embodiments of the Present Invention

A. RFID Device with Magnetic Capabilities

Because RFID tags may be shielded either intentionally or unintentionally by a library patron, it is often important to provide both RFID and magnetic security elements in the tagged library material, preferably on the same tag. When the magnetic security element is dual status, meaning that it may be selectively activated and deactivated, its status is typically changed by the application of a magnetic field to that element. Magnetization operations such as this have no effect on library materials such as books and magazines, but can have harmful effects on magnetically-recorded media. The inventive RFID device with magnetic capabilities solves such problems, preferably without any involvement by library staff members.

Figure 9:
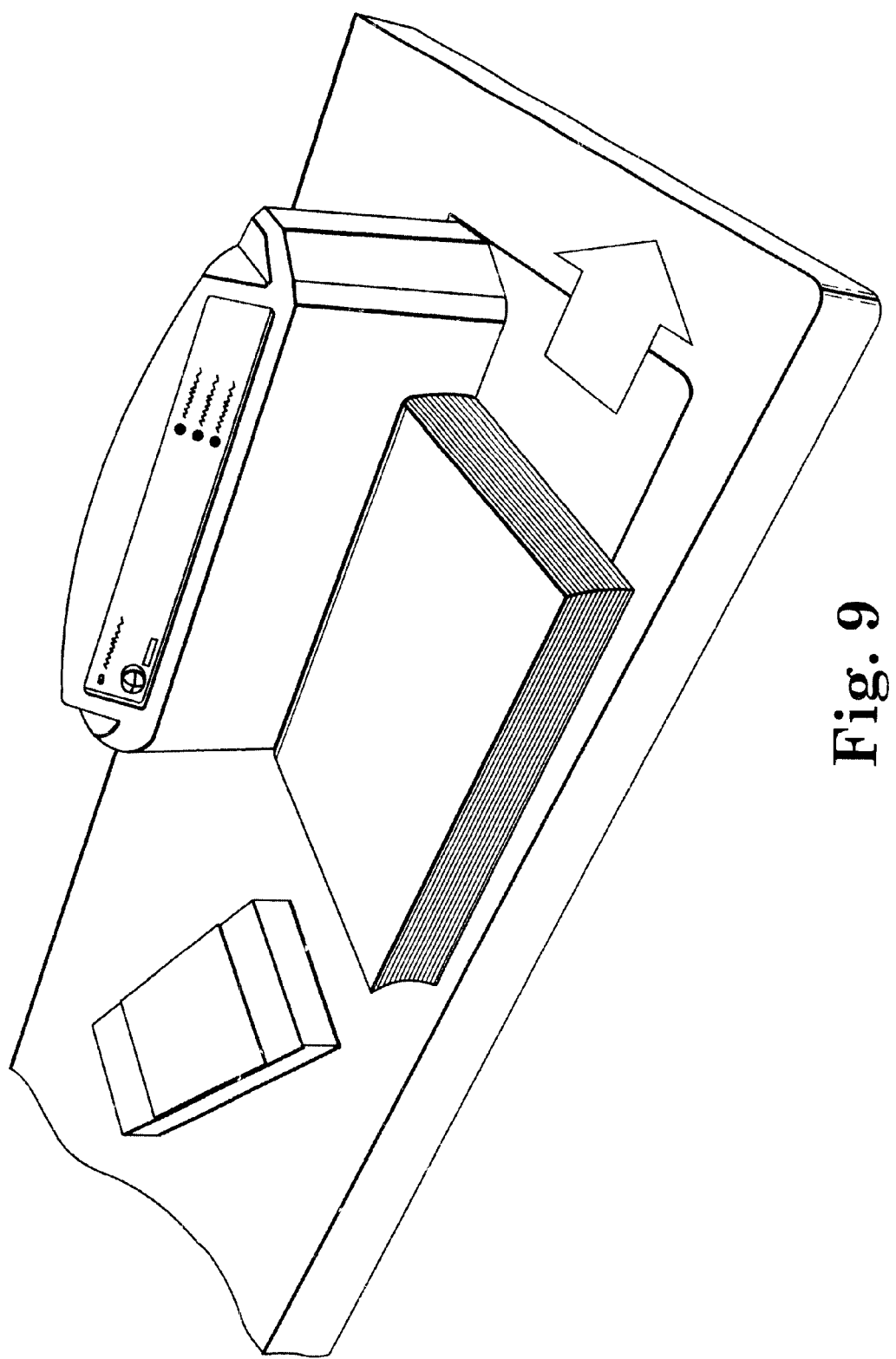
FIGS. 9, 10, 11, 12, 13, 14, 15, and 16 are illustrations of various embodiments of the present invention.

As shown in FIG. 9, an RFID device is equipped to read information from an RFID tag on an item, such as a patron card, book, or other material. Preferably, the information read from the RFID tag includes a designation of media type (magnetic, print, or optical, for example), which can be used to insure the proper subsequent processing of the item. The RFID device is also equipped with a device, such as the coil, designed to enable the activation and deactivation of the security element portion of the item tag. After the RFID device reads the RFID tag, the device transmits the item identification information to a computer having software provided by a library automation vendor, or LAV. Among approximately 50 current LAV software systems are "Dynix," which is available from Ameritech Library Services of Provo, Utah, "Carl ILS" which is available from CARL Corporation of Denver, Colo., and "DRA," which is available from DRA, of St. Louis, Mo.

There are a number of ways to transmit the information obtained from an RFID tag to the LAV system. One would involve using the commands implemented in the 3M Standard Interchange Protocol (SIP). Another would involve using an electronic device known as a "wedge" to transmit the information as if it originated from a conventional barcode scanner. These and other techniques are well-known to those skilled in the art. In this manner, the RFID component of the RFID device performs the functions formerly performed by an optical bar-code scanner, which may or may not continue to be used with the device. Thus, libraries may continue to use their existing LAV software system interfaces and terminals while enjoying the added functionality and features provided by RFID technology. The RFID device need not include a display if it would cooperate with an existing LAV software system display to provide feedback to the operator. Optionally, a display and other feedback mechanisms may be included in the RFID device as an integrated package.

In devices having both RF and optical bar code reading capabilities, the device should be able to handle library materials tagged with RF tags, bar code labels, or both. In operation, the device would process an item for check-in by scanning for an RFID tag, a barcode, or both, retrieving the item identification code and, preferably, the media type from one or both of these tags, and passing this information on to the LAV software system. When the device includes both an RFID system and an optical bar code scanning system, the device may also be used to create RFID tags for media that is only bar-coded. First, the bar code would be scanned, and then the identifier (or an ID code associated with that identifier, depending on system design) would be written to (recorded onto) the RFID tag along with other data, such as media type and other selected information returned from the LAV software system relative to that media. The RFID tag could then be applied to the item.

The RFID device of the present invention preferably also performs "smart" resensitizing and desensitizing of the magnetic security elements attached to library materials. When the device reads the RFID tag and transmits the identification information to the LAV software, the LAV software can be programmed to respond with an indication of the type of library material with which the RFID tag is associated. If the LAV software responds with an indication that the tagged material is something for which a specialized magnetization operation is required (magnetically-recorded media, typically), then the device can activate only the system that performs that operation. For example, if the LAV software indicates that the RFID tag is associated with an ordinary book, and that the book may be checked out by the requesting patron, then one magnetization system may be activated to deactivate the magnetic element associated with that book. However, if the LAV software indicates that an RFID tag is associated with a video tape, for example, then a different magnetization system may be activated to deactivate the magnetic security element associated with that video tape. This different magnetization system might involve, for example, a weaker magnetic field or a field confined to the region in the immediate vicinity of the security element, so as to prevent damage to the magnetic media itself, depending on the detailed characteristics of the security tags in use. Depending on the detailed design of the device, the procedure might include inhibiting automatic activation so as not to damage magnetic media.

Preferably, sufficient information may be stored in the memory of the RFID tag itself that the interrogation source need not transmit that information to the LAV software, and can instead invoke the appropriate magnetization system directly. This embodiment would likely improve system performance, because fewer steps are required to reach the same result. As a minimum, the RFID tag should store a media type in the memory of the RFID element, but could as noted above include additional information. This type of processing, without transmission back to a database separate from the RFID device, is referred to herein as happening in "real time."

An advantage of an RFID device such as that described is that it may accept and process items with less dependence on their orientation relative to the device. Thus, although a library material may be processed by an optical bar code scanner only when the bar code label is properly positioned and readable by the scanner, a book having an RFID tag or combination tag may be positioned with front cover either up or down, and without the need to carefully align a label with a scanner. This advantage of RFID systems over conventional optical and bar code systems results in considerable time savings for patrons and library staff. The "read range" may be different with different scanners, tags, and other components, but it is believed that a read range of approximately 15 centimeters (6 inches) would be satisfactory. To facilitate reliable RFID scanning, however, it may be desirable to position the RFID tags for various items at the same fixed position relative to an edge of the item. For example, RFID tags provided on library books might all be positioned 2 inches above the bottom of the book.

The benefits of the inventive RFID device are numerous and significant, and include having only a single station at which to identify, resensitize, and desensitize library materials, the elimination of operator training on and performance of different magnetization operations, increased processing speed due to the reduction of orientation constraints present in bar-code only systems, and decreased likelihood of repetitive stress injury to operators. Another benefit is that it is faster to scan RFID tags than to read a bar code, especially for codes that are inside the cover or case of the item, in large part because the user need not locate and align a bar code. Lastly, the system also is a low cost one because RFID readers are expected to cost less than high-performance bar-code scanners. These and other benefits and advantages will be apparent to one of skill in the art.

B. Use of RFID Device with Multiple Items

Figure 10:
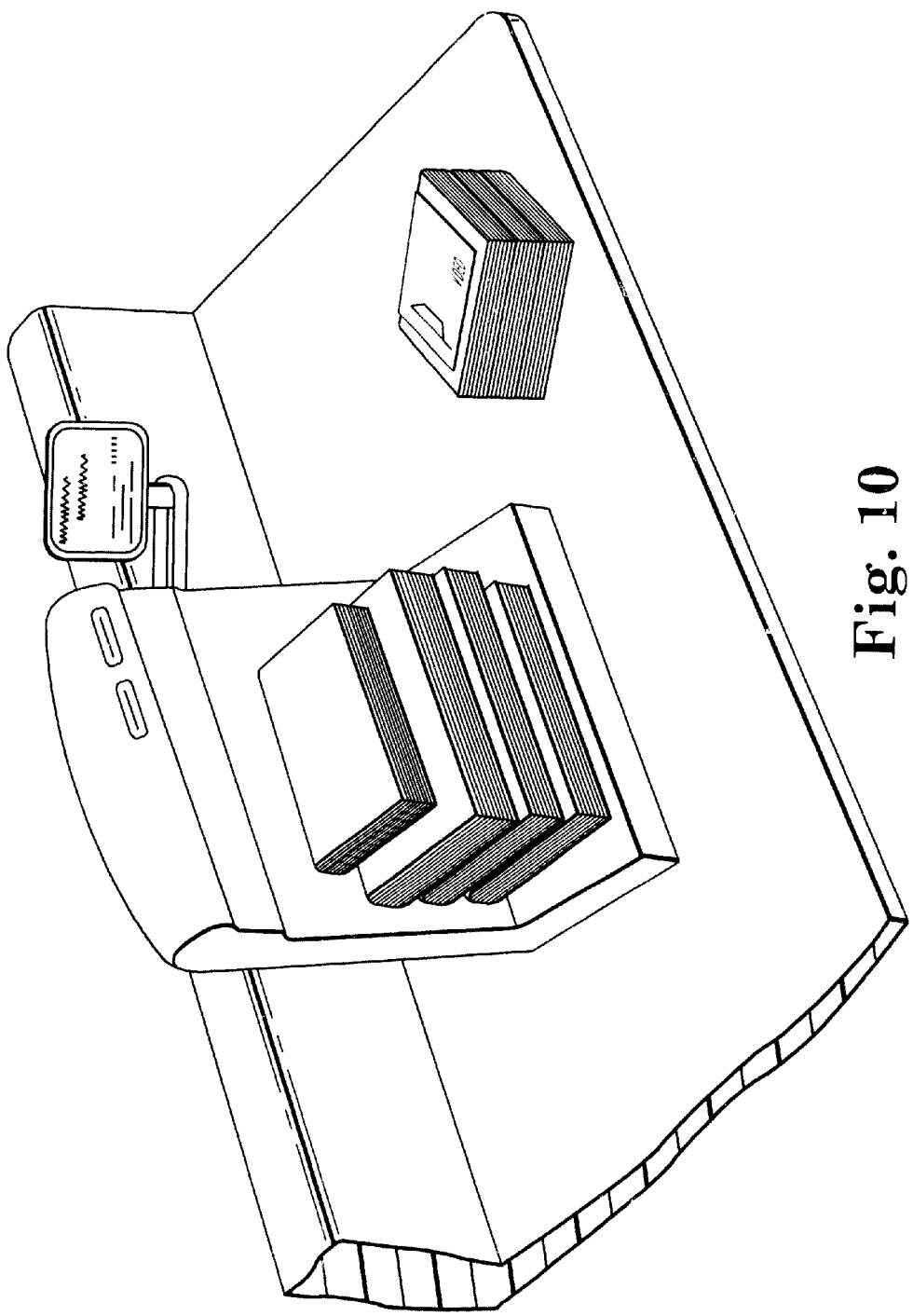

Another benefit of an RFID device is the ability to process multiple items at one time, as shown in FIG. 10. Whereas conventional devices having only optical bar code scanners can process only a single item presented to the bar code scanner at one time, a group of items having RFID elements may be processed essentially simultaneously. This may be achieved by having multiple RFID interrogation sources (readers) mounted in or on the device, or by having a single high-speed RFID reader that possesses the multi-item identification algorithms. This capability greatly reduces the time required for library staff to process multiple items.

Figure 12:
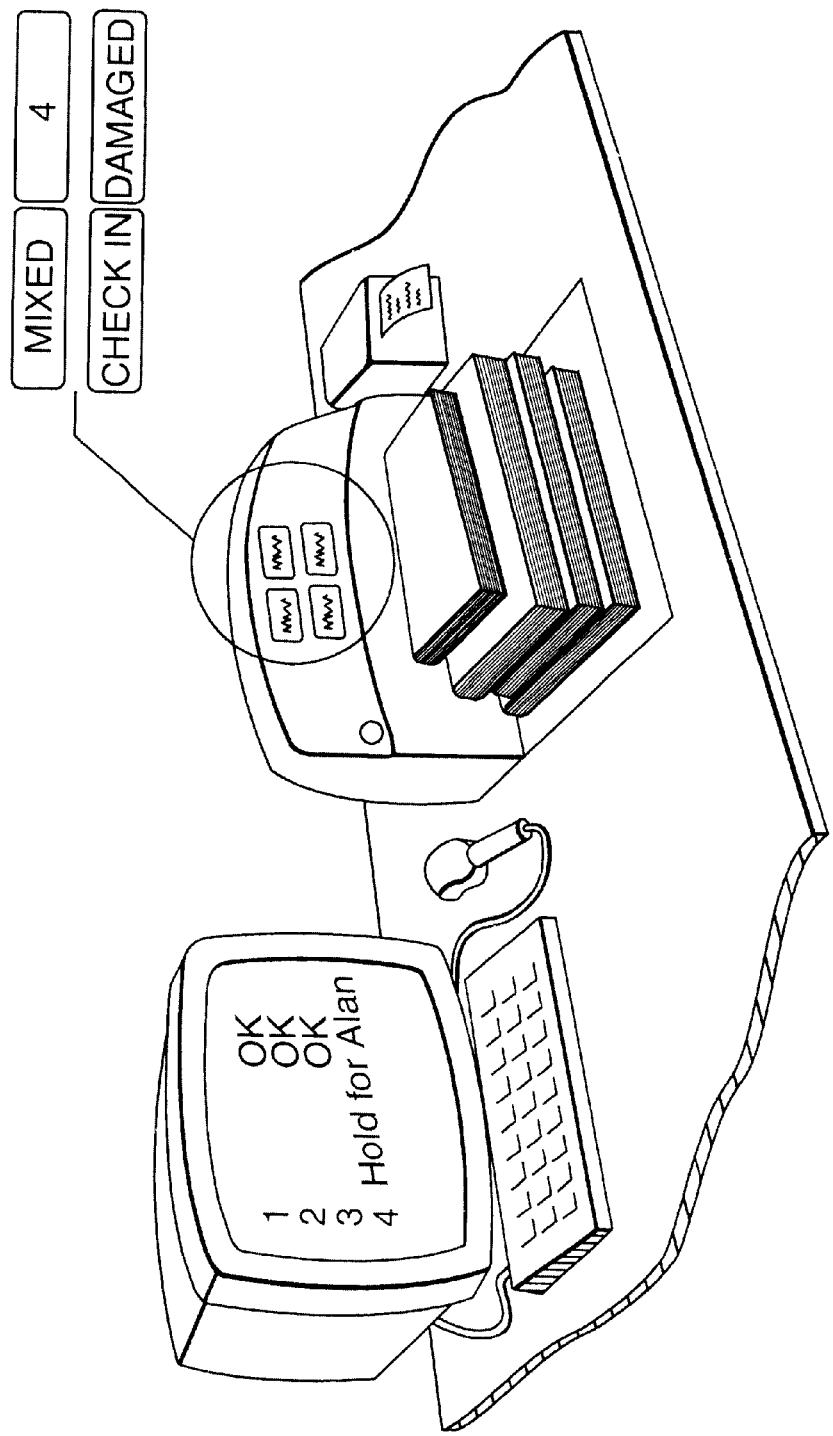

To avoid having the device perform a magnetization operation that is inappropriate for one or more of a group of materials being processed, the device may be adapted to provide a message to the user requesting that all materials of a certain kind (books and magazines, for example) be presented together, followed by all materials of another kind (video and audio tapes, for example). The RFID reader can determine from the information obtained from individual RFID elements whether the user has segregated the materials appropriately, and can prompt the user if he or she has not, as shown in FIG. 12. In another embodiment, the device includes one area for processing media of one type (books and magazines, for example), and a separate area for processing media of another type (video and audio tapes, for example). The proper magnetization operation may then be reliably performed as to each material.

The device may also include a display for indicating how many items bearing RFID tags have been presented for processing by the device. That is, the RFID reader would obtain information from each item presented to the device, and update the display to indicate that there were, for example, five items present. An optical or other detector could also be used to verify that the same number of items were indeed present, so as to alert the patron or library staff if an item without an RFID tag had been inadvertently or intentionally included in the stack of other materials. Optical detectors of this type may include those described in U.S. patent application Ser. No. 09/058,585 (Belka et al.), filed Apr. 10, 1998 and entitled "Apparatus and Method for the Optical Detection of Multiple Items on a Platform," which is assigned to the assignee of the present invention, the contents of which is incorporated by reference herein. Other detectors may include ones based on weight (in which the RFID reader can determine from the RFID tag or the LAV software the weight of the items detected, and compare it to the actual weight of the materials presented), or the number of magnetic elements detected (as described in U.S. Pat. No. 5,260,690 (Mann et al.), the contents of which is incorporated by reference herein). Comparison of the number of items detected by the RFID reader and the number detected by an optical or other detector insures that the magnetic security elements associated with non-RFID tagged items are not deactivated without the item also being charged out to a specific patron. The device may process the items after a predetermined number of items have been presented (five items, for example), or after an operator instructs the device to process the items, or automatically without any operator intervention. A suitable display may advise the operator as to the status of the operation.

Figure 11:
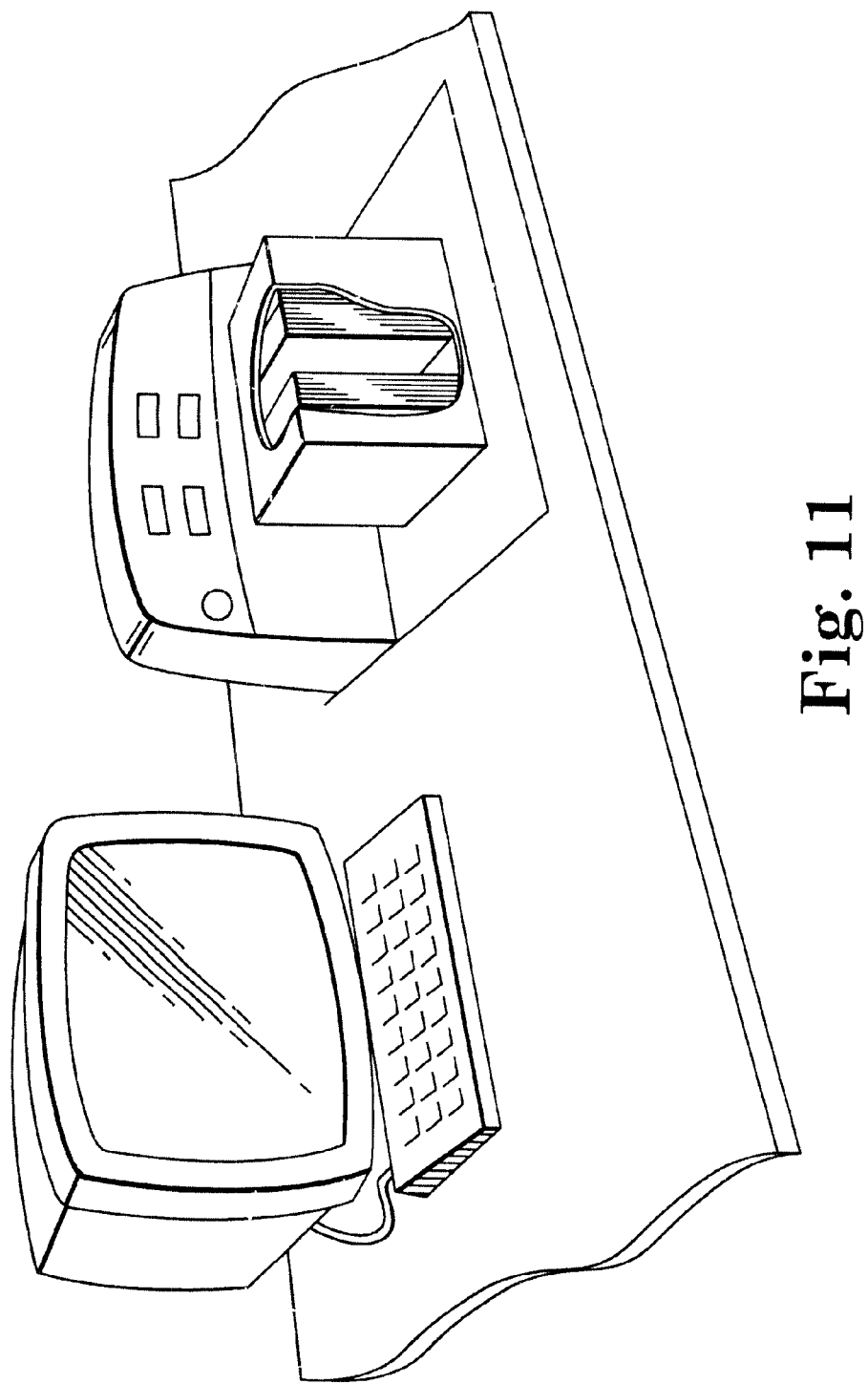

Another embodiment of the inventive device is the ability to verify the content of a package or case having multiple items inside, as shown in FIG. 11. For example, a set of audio tapes may be packaged together inside a single case. To insure that only those tapes, and all of those tapes, are being processed together, the RFID reader can identify the case, and identify each of the tapes inside the case, and match the identities before permitting the materials to be checked out to a patron. The RFID tag on the case may include the information as to the contents of the case, or that information may be stored in the LAV software and accessed through the identification information obtained from the RFID) tag.

Devices having the ability to process multiple materials further increases the speed with which materials may be checked into and out of a library. The device may be adapted to transmit only a single signal to the LAV software system to process multiple items, and to receive only a single signal back from that software in response.

C. Portable RFID Devices

For a number of applications, it is desirable to provide a portable, preferably hand-held, RFID device. The hand-held RFID device is capable of searching among shelves, bins, piles and library carts. It can essentially search wherever it can be positioned close enough to the items. It is capable of identifying multiple items that are within the range of the device. These and other features make the inventive portable RFID device a valuable library tool. For simplicity, portable RFID devices will be described first in terms of their components and operation, and second in terms of various useful functions for or methods of using such devices. It is important to note that the functions or methods described herein are equally applicable to non-portable RFID devices, and that the functions or methods described above in reference to non-portable RFID devices are similarly applicable to portable RFID devices. The different functions and methods have merely been grouped together with the type of RFID device more often used to perform that function or method.

1. Components and Operation

The hand-held RFID device of the present invention preferably includes an RFID reader and writer, memory, a power source, and software to enable various functions of the types described herein. The RFID reader/writer could consist of a Commander 320 13.56 MHz RFID reader, manufactured by Texas Instruments of Dallas, Tex. Memory, preferably in the form of a computer, may be provided by, for example, a "palm-top" or handheld computer available from 3Com Company of Santa Clara, Calif. under the designation Palm Pilot. The portable computer may include an operating system, a touch-screen display, several buttons for developing user interfaces, a recharge station, a docking station to transfer data between the device and another computer, one or more ports to connect peripherals to the hand-held device (such as an RFID reader) and a battery power supply. Some units may also include a built-in peripheral such as a bar-code scanner. It may also contain various feedback systems, including lights, audio and a display.

Figure 14:
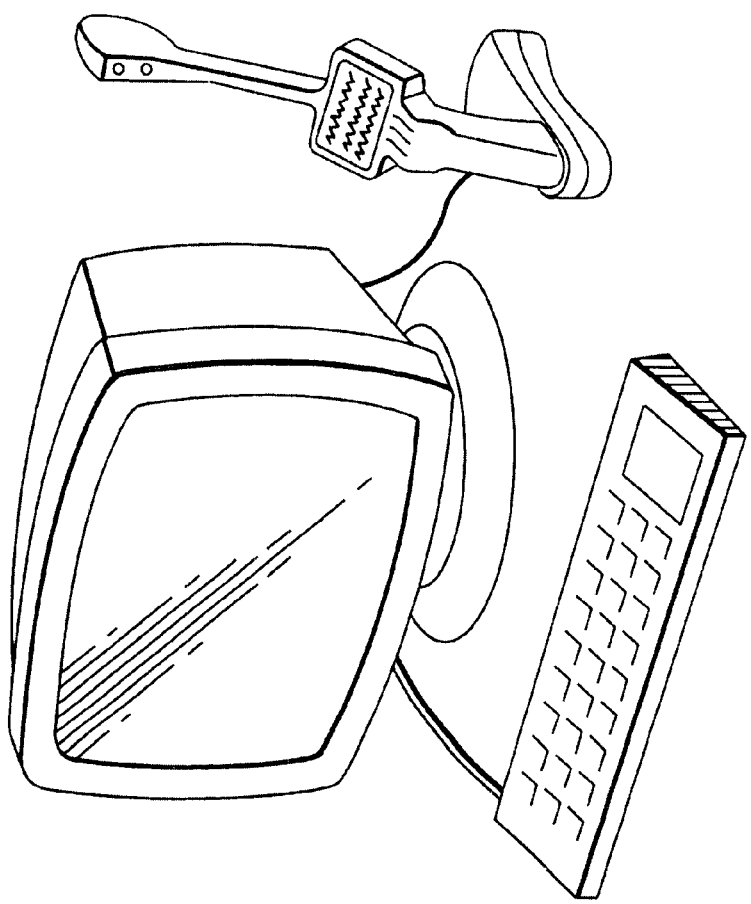

As described above, there are a number of options for transferring data between the hand-held device and another processing station. A docking station approach can be used to upload or download data, as shown in FIG. 14. This method could be used, for example, to upload item identification information prior to performing a search to find those specific items. Another example would be to download data following a collection of items that have been used within the library. The link could be implemented as a docking station (as illustrated); as a wireless or cabled download and/or upload; as a wireless or cabled, real-time link between the hand-held device and another processor, or in any other manner suitable for transferring such data. One such example is a SPECTRUM 24 wireless LAN system, from Symbol Technologies of Holtsville, N.Y. Systems like the SPECTRUM 24 allow mobile users to wirelessly communicate between mobile devices and local area networks. For this operation, the mobile unit will typically include a communication component to support wireless communication, such as Symbol's LA 2400 Wireless LAN PC Card.

The user interface for the device is designed both to communicate the status of searching and to allow the user to enter data. Entering data may include switching the device among various search modes and entering data specific to a task (for example, to check out an item, or to put an item on hold). Feedback to the user is preferably provided through a combination of sound, lights and a display. The display may either be integrated into the unit or separated. When separate, it can be designed in various ways, including as a "wearable" display that can be easily viewed by the user.

Figure 13:
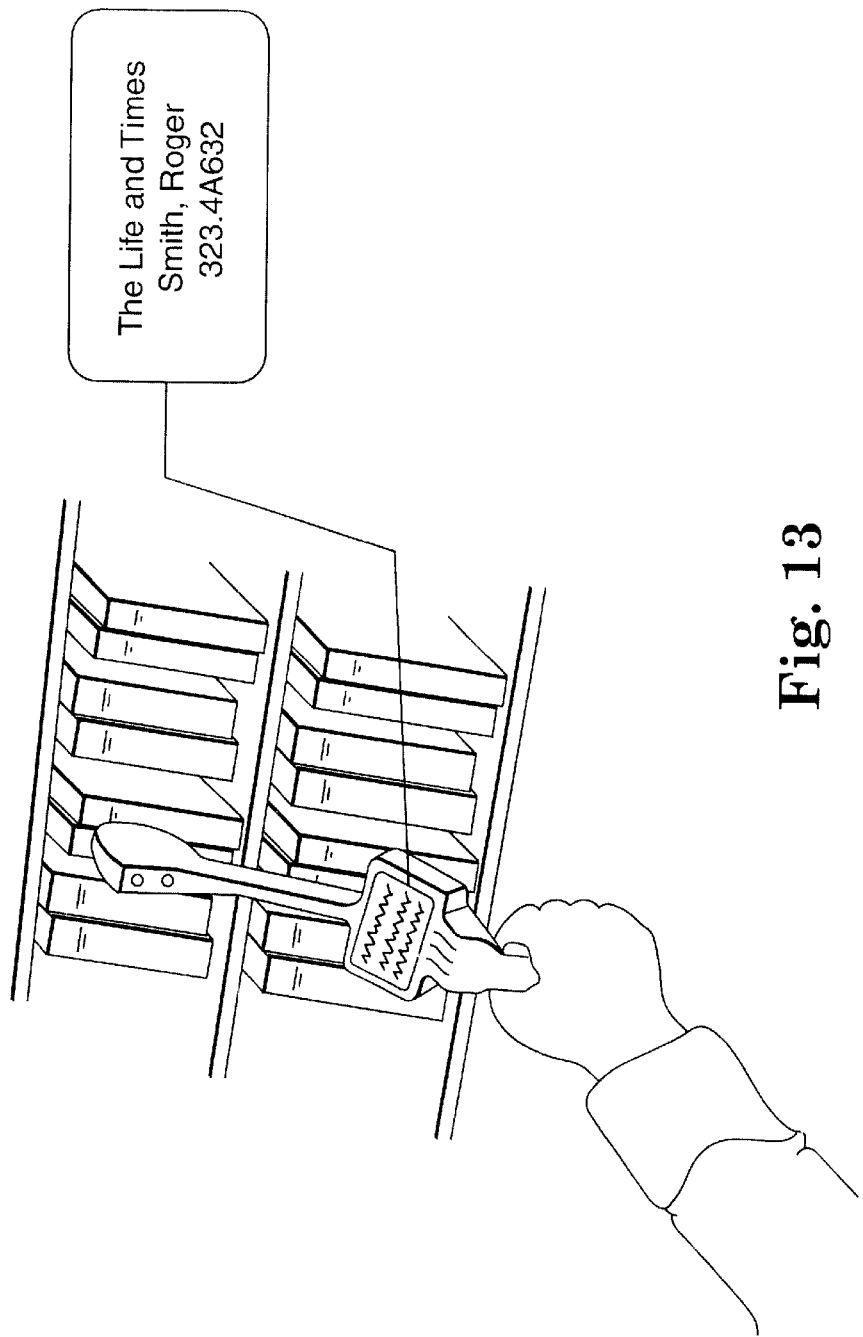
Figure 15:
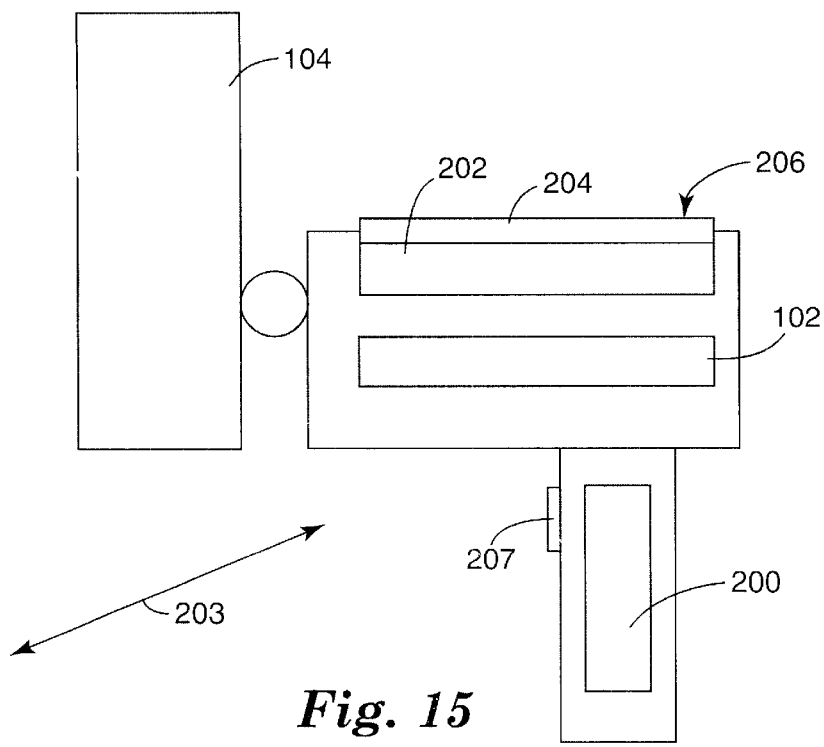
Figure 16:
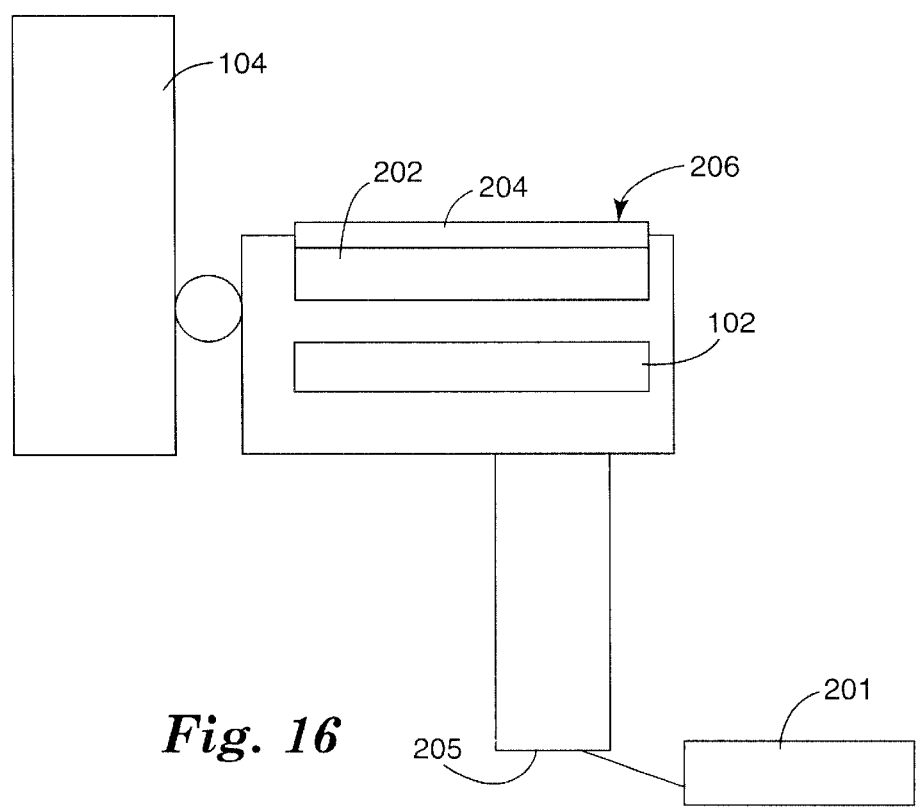

A particularly useful embodiment of the hand-held RFID device is as follows. A hand-held RFID device is provided in which the RFID reader, use interface, power source, antenna, processor, and software are all provided in a single integrated unit, as shown in FIG. 13. By using a hand-held computer such as the Palm Pilot described above, a number of real-time functions of the type described below can be achieved, in contrast to systems in which the RFID device must interact with a separate computer, database, software system, and the like. The software can also provide either limited or full-range capabilities for supporting functions of the type described herein, as desired. The hand-held RFID) device also preferably includes an integral power source, although it can be tethered to a larger power source of the type that might be worn around a user's waist. In the case of an integral power source, the source may or may not power the processor, and may be recharged when connected to a docking station. When a hand-held computer is used, it may include its own power source, and may be recharged when connected to the docking station to upload and/or download information, as shown in FIG. 14. FIG. 15 illustrates an embodiment of the present invention in which a computer 202, an antenna 104 to transmit commands between an RFID tag and an RFID reader, an RFID reader 102 for reading information from multiple RFID elements substantially simultaneously, and a display 204 are provided as an integrated unit. Computer 202 and display 204 may be components of a detachable hand-held computer 206, such as a Palm Pilot. FIG. 15 also illustrates an integral power source 200, a wireless data transfer system (indicated by arrow 203), and a trigger 207. FIG. 16 illustrates a separate power source 201 that is tethered to the device, and a cabled connection 205.

A hand-held RFID device can interrogate and identify RFID-tagged items whenever it is activated within range of the items. Intermittent activation can be provided by, for example, a trigger associated with the device, so that the elapsed time for which power is required for the RFID device is minimized. The reading distance is a function of many factors, but is expected to be between 15 and 45 centimeters (6 and 18 inches) given current technology and the likely frequencies at which the system would operate. In some applications, it may be desirable to restrict the operating range of the device so that it only interrogates RFID tags associated with items at a closer range. In other cases, the longest available range of operation will be desired. In other applications, it may be preferred to restrict the output power (and thus the reading range) to permit longer continuous operation from the battery pack. The read range will also be influenced by the design of the antenna as well as the orientation of the RFID tag relative to the antenna. It should be appreciated that the read range, battery weight, and lifetime between battery recharges or replacement are often dependent on each other. Various tradeoffs can be envisioned, based on the particular application for the device.

In operation, a particularly useful feature of a hand-held device is obtaining real-time information regarding an item that has been scanned by the device. That is, the hand-held device obtains information from the RFID tag, and either immediately displays that information, or immediately displays information stored within the hand-held device that is related to the tagged item. This is in contrast to devices that must be docked with or otherwise communicate with a separate database of information before that information can be displayed for the user. The hand-held device of the present invention can also be docked or can otherwise communicate with a separate database, if such features are desired.

2. Functions, Methods, and Applications

The hand-held RFID device of the present invention can be used for a number of functions, methods, and applications, including the following.

The inventive handheld RFID device has particular usefulness in item location. For example, the device could be programmed with specific information identifying certain items that an operator wishes to locate. The unique identifier for each desired item would be stored in a reserved memory location in the handheld computer. As the identifiers of, for example, items on a shelf were read by the RF reader, each would be compared, using standard software routines known to those skilled in the art, with the list of items stored in memory. When a match occurred, the device would then create one or more visual, audio, tactile, or other signals indicating the presence of the item. One application for this function includes locating items that are believed to be missing. A library typically maintains a list of missing items—those items that are expected to be in the library, but cannot be found. By downloading those missing item identifiers to the hand-held device, the operator can pass the device by items and obtain feedback when a missing item is encountered.

Another example is to locate items that have not circulated or been used within a given number of months. Again, the identifiers of those items could be downloaded to the hand-held device for searching. Alternatively, the circulation counts can be maintained directly on the memory of the RFID tag. In this case, the hand-held device does not need to download any data from another computer system. The hand-held device only compares RFID memory data to established criteria and provides feedback to the operator based on the selected parameters.

Another example of where data can be either downloaded from a library data base to the hand-held device or obtained directly from the RFID tag is to locate items in the library that have not been checked in. A list of items not checked-in could be obtained and then downloaded to the hand-held device or the RFID tag could maintain a memory location to indicate the check-in status of an item. When the RFID tag memory indicates the check-in status, the hand-held device does not need any data from an external database to perform the search. A natural application of obtaining matching data directly from the RFID tag is to locate items that belong to different library buildings or to different library systems. For this application, the owning library is preferably encoded onto the RFID tag and the hand-held device alerts the operator when an RFID tag with a different owning library code is encountered. The hand-held RFID device could also be used to determine, as with the RFID device described above, whether all members of a set of associated items are present together, as with the tapes in a books-on-tape case.

The RFID device of the present invention could also be used to verify the order of materials on a shelf. In this mode, the device is scanned across one or more rows of items. The device reads each item and indicates, to the operator, which items are not shelved in the correct order. As input, the device has access to the shelving algorithm used by the library for the section being scanned. Possible algorithms include: Dewey Decimal order, Library of Congress order, and Author last name/Title order. Other methods of sorting, as determined by each library, are possible.

Another method of establishing shelf information is to associate each item with a location. Shelf locations can be as specific or as general as the library desires. For example, a general shelf location might include all "Adult Fiction titles." A more specific shelf location might be "Adult Fiction, Authors AA–AB." In the preferred embodiment, the shelf location for an item is encoded directly in the RFID tag memory for that item. An indexing system may also be used to save memory, so that a short code number is used to indicate a shelf location. For example, the number 1 could represent Adult Fiction, the number 2 could represent Juvenile Fiction, and so on. The amount of memory needed to store all shelf locations depends on the number of locations within a library. Another embodiment is to obtain the desired shelf location from a library database and then download those locations as part of the transfer of data to the hand-held device.

When items are associated with a shelf location, by either method above, the operator can use the hand-held device to locate items that are in the wrong location. Two processing methods can be used to determine which shelf location is currently being processed in order to search for items with non-matching locations. In one embodiment, the correct shelf location is obtained by reading several RFID tags and heuristically processing the data to infer a location. For example, if the RFID device reads a certain number of tags that are indexed to the Adult fiction area, the device can be programmed to alert the user when non-Adult Fiction items are encountered. In another embodiment, the library places "location tags" on the shelves or other locations to be searched. These location tags are first read by the hand-held device to indicate that subsequent items read should belong to that location and an alert is provided when a mismatch occurs.

In another embodiment, the hand-held RFID device may be used to enter data into the device as to a specific item. That information may be either transmitted immediately and directly to the LAV software, or may be transmitted subsequently when the hand-held device is reconnected to a docking station and downloads the information to the LAV software. For example, when a user takes a library material from its location, the user may input the new status of the article into the hand-held RFID device. Because this information must be entered into the LAV software eventually, it saves the operator time to be able to indicate this state directly and immediately as opposed to waiting until he or she can access an LAV software system terminal.

In yet another embodiment, the hand-held device could be used to provide additional information about a specific item once the item has been obtained and its RFID tag scanned by the RFID device. For example, library staff may collect materials that have been used in the library, and scan those materials either to obtain more information about that material (who last checked it out; how often has it been used) or to provide information to a database that generates statistical profiles of library material usage, or both. The operator simply reads the RFID tags of the items as they are collected from the various locations in the library at which they were used. As items are collected, the operator can also indicate from where the items were collected by selecting from a list of locations, entering a location code or reading a "location RFID Tag" that is associated with that location and would preferably be affixed to or near that location. In this way, the library staff is able to obtain additional information about where in the library such materials were used. Alternatively, if items used in the library are first placed on a book cart, for example, the hand-held device could make a single pass by the items on the cart to record them. The functions described in this paragraph are referred to herein as "sweeping."

The benefits of a hand-held RFID device are numerous, and include the ability to locate items more quickly and accurately compared to reading each call number or title from items, the ability to "get close" to desired item quickly and then examine items more closely to locate item of interest, the ability to quickly identify items matching a given set of criteria (lost, not checked out, matching specific circulation values, etc.), and the ability to identify items that are mis-shelved and indicate, to the operator, the correct location for the items. This would include items that don't belong in the collection being scanned. Other advantages include the ability to enter transactions directly into the hand-held unit when items are located, the ability to identify an item without having to scan a bar code or any other markings on the item, such as author, title and call number, and the ability to determine if a given item is somewhere on a shelf, on a library cart, in a bin, on a table or even in a pile. These and other advantages will be apparent to those of skill in the art.

In the claims appended hereto, persons of ordinary skill will recognize that the items recited could be library materials (including books, periodicals, magnetic or optical media, and the like), or could be other completely unrelated materials such as packages, letters, paintings, electronic devices, animals, automobiles, bicycles, or any other items of value.

We claim:

1. A hand-held RFID device, comprising as an integrated unit:

(a) a computer;
(b) an antenna to transmit commands between an RFID tag and an RFID reader;
(c) an RFID reader for reading information from multiple RFID tags substantially simultaneously; and
(d) a display.

2. The hand-held RFD device of claim 1, further comprising:
(e) an RFID writer for transmitting information to an RFID tag for storage therein.

3. The hand-held RFID device of claim 1, further comprising:
(e) a data transfer system for transferring data from the RFID device to a separate database.

4. The hand-held RFID device of claim 3, wherein the data transfer system comprises a connection for operatively coupling with a docking station.

5. The hand-held RFID device of claim 3, wherein the data transfer system comprises a cabled data transfer connection.

6. The hand-held RFID device of claim 3, wherein the data transfer system comprises a wireless data transfer system.

7. The hand-held RFID device of claim 1, wherein the device includes an integral power source.

8. The hand-held RFID device of claim 1, wherein the computer is a detachable hand-held computer.

9. The hand-held RFID device of claim 8, wherein the computer includes a power source separate from the source of power for the remainder of the device.

10. The hand-held RFID device of claim 8, wherein the detachable hand-held computer comprises a connection for operatively coupling with a docking station.

11. The hand-held RFID device of claim 1, further comprising:
(e) a trigger for intermittent activation of the device.

12. The hand-held RFID device of any one of claims 1 through 10 or 11, further wherein the display is a touch-screen display.

13. The hand-held RFID device of any one of claims 1 through 10, or 11, wherein the hand-held device obtains information from an RFID tag, and immediately displays that information on the display.

14. The hand-held RFID device of any one of claims 1 through 10, or 11, wherein the hand-held device obtains information from an RFID tag, and immediately displays information stored within the hand-held device that is related to a tagged item.

15. The hand-held RFID device of any one of claims 1 through 10, or 11, wherein the device is adapted to verify the order of materials on a shelf.

16. The hand-held RFID device of any one of claims 1 through 10, or 11, wherein (i) the device is programmed with specific information identifying certain items that an operator wishes to locate, (ii) identifiers of items read by the RFID device are compared with the information identifying the certain items; and (iii) when a match occurs, the device creates one or more signals indicating the presence of the item.

17. A hand-held RFID device, comprising as an integrated unit:
(a) a computer;
(b) an antenna to trasmit commands between an RFDI tag and an RFDI reader;
(c) an RFDI reader for reading information from multiple RFDI tags substantially simultaneously;
(d) an RFDI writer for transmitting information to an RFDI tag for storage therein;
(e) a touch-screen display; and
(f) a trigger for intermittent activation of the device.

18. The hand-held RFDI device of claim 17, further comprising a data transfer system for transferring data from the RFID device to a separate database.

19. The hand-held RFID device of claim 18, wherein the data transfer system comprises a connection for operatively coupling with a docking station.

20. The hand-held RFID device of claim 18, wherein the data transfer system comprises a cabled data transfer connection.

21. The hand-held RFID device of claim 18, wherein the data transfer system comprises a wireless data transfer system.

22. The hand-held RFID device of claim 17, wherein the device includes an integral power source.

23. The hand-held RFID device of claim 17, wherein the computer is a detachable hand-held computer.

24. The hand-held RFID device of claim 23, wherein the detachable hand-held computer comprises a connection for operatively coupling with a docking station.

25. The hand-held RFID device of claim 17, wherein the computer includes a power source separate from the source of power for the remainder of the device.

26. The hand-held RFID device of claim 17, wherein the hand-held device obtains information from an RFID tag, and immediately displays that information on the display.

27. The hand-held RFID device of claim 17, wherein the hand-held device obtains information from an RFID tag, and immediately displays information stored within the hand-held device that is related to a tagged item.

28. The hand-held RFID device of claim 17, wherein the device is adapted to verify the order of materials on a shelf.

29. The hand-held RFID device of claim 17, wherein (i) the device is programmed with specific information identifying certain items that an operator wishes to locate, (ii) indentifiers of items read by the RFID device are compared with the information identifying the certain items; and (iii) when a match occurs, the device creates one or more signals indicating the presence of the item.

* * * * *

UNITED STATES PATENT AND TRADEMARK OFFICE
CERTIFICATE OF CORRECTION

PATENT NO. : 6,486,780 B1
DATED : November 26, 2002
INVENTOR(S) : Garber, Sharon R.

It is certified that error appears in the above-identified patent and that said Letters Patent is hereby corrected as shown below:

<u>Title page,</u>
Item [56], References Cited, U.S. PATENT DOCUMENTS, please add:
-- 4,476,469    10/09/84    Lander
   4,835,372    05/30/89    Gombrich et al.
   4,850,009    07/18/89    Zook et al.
   5,008,661    04/16/91    Raj
   5,218,466    06/08/93    Brooks
   5,360,967    11/01/94    Perkin et al.
   5,610,596    03/11/97    Petitclerc
   5,668,803    09/16/97    Tymes et al.
   5,673,037    09/30/97    Cesar et al.
   5,751,221    05/12/98    Stanfield et al.
   5,751,257    05/12/98    Sutherland
   5,804,810    09/08/98    Woolley et al.
   5,808,558    09/15/98    Meck et al.
   5,821,513    10/13/98    O'Hagan et al.
   5,822,714    10/13/98    Cato
   6,032,127    02/29/00    Schkolnick et al.
   6,056,199    05/02/00    Wiklof et al.
   6,057,756    05/02/00    Engellenner
   6,084,528    07/04/00    Beach et al.
   6,182,053    01/30/01    Rauber et al.
   6,218,942    04/17/01    Vega et al.
   6,232,870    05/15/01    Garber et al.
   6,244,512    06/12/01    Koenck et al. --
"5,656,592 A    8/1997 Spaaneburg.......364/490" should read
-- 5,656,592 A    4/1987 Spaanenburg.......364/490 --.
FOREIGN PATENT DOCUMENTS, please add: -- WO 00/16280   03/23/00   WIPO --
OTHER PUBLICATIONS, please add:
-- "VTLS RFID Solution" from VTLS Inc. Web site (2 pgs.) dated 9/13/2001
Jeff Hedlund et al., "SmartBookcase" (2 pgs.) dated 9/13/2001
Abstract of article entitle "TI: The role and function of the shelflist in an automated library environment"; 1996 (1 pg.) --

<u>Column 9,</u>
Line 1, "Morristown, N.J." should read -- Morristown, N.Y. --.

<u>Column 14,</u>
Line 31, delete ")" following "RFID".

UNITED STATES PATENT AND TRADEMARK OFFICE
CERTIFICATE OF CORRECTION

PATENT NO. : 6,486,780 B1
DATED : November 26, 2002
INVENTOR(S) : Garber, Sharon R.

It is certified that error appears in the above-identified patent and that said Letters Patent is hereby corrected as shown below:

<u>Column 15,</u>
Lines 24 and 26, "SPECTRUM 24" should read -- SPECTRUM24 --.
Line 44, "use" should read -- user --.
Line 53, delete ")" following "RFID".

<u>Column 19,</u>
Line 8, "RFD" should read -- RFID --.

<u>Column 20,</u>
Line 8, "trasmit" should read -- transmit --.
Lines 8 and 9, "RFDI" should read -- RFID --.
Line 51, "indentifiers" should read -- identifiers --.

Signed and Sealed this

Sixth Day of April, 2004

JON W. DUDAS
*Acting Director of the United States Patent and Trademark Office*

(12) INTER PARTES REEXAMINATION CERTIFICATE (930th)
United States Patent
Garber et al.

(10) Number: US 6,486,780 C1
(45) Certificate Issued: Aug. 8, 2014

(54) APPLICATIONS FOR RADIO FREQUENCY IDENTIFICATION SYSTEMS

(75) Inventors: Sharon R. Garber, Crystal, MN (US); Bernard A. Gonzalez, St. Paul, MN (US); Mitchell B. Grunes, Minneapolis, MN (US); Richard H. Jackson, Inver Grove Heights, MN (US); Gerald L. Karel, Maplewood, MN (US); John M. Kruse, Minneapolis, MN (US); Richard W. Lindahl, Oakdale, MN (US); James E. Nash, Bloomington, MN (US); Chester Piotrowski, White Bear Lake, MN (US); John D. Yorkovich, Maplewood, MN (US)

(73) Assignee: 3M Innovative Properties Company, St. Paul, MN (US)

Reexamination Request:
No. 95/001,344, Apr. 20, 2010

Reexamination Certificate for:
Patent No.: 6,486,780
Issued: Nov. 26, 2002
Appl. No.: 09/619,220
Filed: Jul. 19, 2000

Certificate of Correction issued Apr. 6, 2004

Related U.S. Application Data

(60) Division of application No. 09/368,826, filed on Aug. 5, 1999, now Pat. No. 6,232,870, which is a continuation-in-part of application No. 09/344,758, filed on Jun. 25, 1999, now abandoned, which is a continuation-in-part of application No. 09/134,686, filed on Aug. 14, 1998, now abandoned.

(51) Int. Cl.
G08B 13/24 (2006.01)
G07F 7/00 (2006.01)
G07G 1/00 (2006.01)
G06K 7/10 (2006.01)
G06K 19/077 (2006.01)
G06K 17/00 (2006.01)

(52) U.S. Cl.
USPC .................. 340/572.1; 235/385; 340/5.92

(58) Field of Classification Search
USPC ............................................. 340/572.1
See application file for complete search history.

(56) References Cited

To view the complete listing of prior art documents cited during the proceeding for Reexamination Control Number 95/001,344, please refer to the USPTO's public Patent Application Information Retrieval (PAIR) system under the Display References tab.

*Primary Examiner* — Christina Y Leung

(57) ABSTRACT

The present invention relates to RFID devices, including handheld RFID devices, and applications for such devices. The devices and applications may be used in connection with items that are associated with an RFID tag, and optionally a magnetic security element. The devices and applications are described with particular reference to library materials such as books, periodicals, and magnetic and optical media.

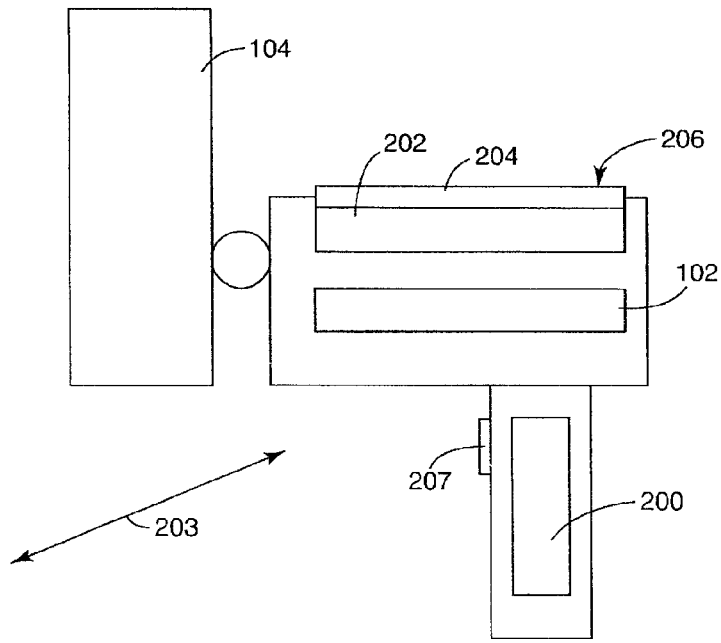

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-29 are cancelled.

\* \* \* \* \*